United States Patent
Saegusa et al.

(10) Patent No.: US 10,048,365 B2
(45) Date of Patent: Aug. 14, 2018

(54) MOBILE BODY MEASUREMENT DEVICE AND MEASUREMENT METHOD

(71) Applicant: The Yokohama Rubber Co., LTD., Minato-ku, Tokyo (JP)

(72) Inventors: Hiroshi Saegusa, Hiratsuka (JP); Tsuyoshi Kitazaki, Hiratsuka (JP)

(73) Assignee: The Yokohama Rubber Co., LTD. (JP)

( * ) Notice: Subject to any disclaimer, the term of this patent is extended or adjusted under 35 U.S.C. 154(b) by 750 days.

(21) Appl. No.: 14/411,913

(22) PCT Filed: Jun. 12, 2013

(86) PCT No.: PCT/JP2013/003694
§ 371 (c)(1),
(2) Date: Dec. 29, 2014

(87) PCT Pub. No.: WO2014/045496
PCT Pub. Date: Mar. 27, 2014

(65) Prior Publication Data
US 2016/0202353 A1    Jul. 14, 2016

(30) Foreign Application Priority Data

Sep. 21, 2012   (JP) ................. 2012-208342
Dec. 20, 2012   (JP) ................. 2012-278530

(51) Int. Cl.
*G01S 13/58*   (2006.01)
*G01S 13/88*   (2006.01)
*G01P 13/04*   (2006.01)

(52) U.S. Cl.
CPC ............ *G01S 13/58* (2013.01); *G01S 13/589* (2013.01); *G01S 13/88* (2013.01);
(Continued)

(58) Field of Classification Search
CPC ........ G01S 13/58–13/589; G01S 13/62; G01S 13/88; A63B 2220/00–2220/89
See application file for complete search history.

(56) References Cited

U.S. PATENT DOCUMENTS

| | | |
|---|---|---|
| 5,246,232 A | 9/1993 | Eccher et al. |
| 5,401,026 A | 3/1995 | Eccher et al. |

(Continued)

FOREIGN PATENT DOCUMENTS

| | | |
|---|---|---|
| JP | H08-500251 | 1/1996 |
| JP | 2002-071802 | 3/2002 |
| JP | 2012-063151 | 3/2012 |

OTHER PUBLICATIONS

International Search Report for International Application No. PCT/JP2013/003694 dated Jul. 16, 2013, 2 pages, Japan.

*Primary Examiner* — Matthew M Barker
(74) *Attorney, Agent, or Firm* — Thorpe North & Western

(57) ABSTRACT

A single antenna has directionality, transmits a transmission wave toward a golf ball on the basis of a supplied transmission signal, receives a reflected wave that is reflected off the golf ball, and generates a reception signal. A Doppler sensor generates as time series data a Doppler signal having a Doppler frequency. A measurement processing unit calculates a movement direction of a mobile body on the basis of the correlation between the movement direction of the mobile body and the differential between the velocity of a mobile body for a reference time measurement obtained in advance and the velocity of the mobile body after a prescribed amount of time has elapsed from the reference time.

18 Claims, 16 Drawing Sheets

(52) U.S. Cl.
 CPC ....... *A63B 2220/30* (2013.01); *A63B 2220/89* (2013.01); *G01P 13/04* (2013.01)

(56) References Cited

U.S. PATENT DOCUMENTS 6,547,671 B1 * 4/2003 Mihran .............. A63B 24/0021
 473/131
6,682,446 B2 * 1/2004 Bolin ................ A63B 24/0021
 473/199

* cited by examiner

MOBILE BODY MEASUREMENT DEVICE AND MEASUREMENT METHOD

TECHNICAL FIELD

The present technology relates to a measurement device and a measurement method for measuring a movement direction and a movement velocity of a mobile body.

BACKGROUND

As a method of measuring a velocity of a mobile body, a Doppler method that transmits an electromagnetic wave or an ultrasonic wave as a transmission wave and calculates the velocity from a frequency variation between the transmission wave and a reflected wave from the mobile body is widely known.

Techniques that use the above Doppler method to measure both the movement direction and the movement velocity of a mobile body have been proposed (see for example Japanese Unexamined Patent Application Publication Nos. 2002-071802 and 2012-063151).

Japanese Unexamined Patent Application Publication No. 2002-071802 describes transmitting ultrasonic waves from a single transmitter toward a mobile body (golf club head) and receiving reflected waves reflected from the mobile body with three receivers provided at different locations. The relative velocities of the mobile body in the direction of the received waves is calculated based on Doppler signal components included in the reflected waves detected by the receivers, a velocity vector of the mobile body is calculated on the basis of the relative velocities, and the movement direction (angle) of the mobile body is calculated on the basis of the orientation of the velocity vector.

Japanese Unexamined Patent Application Publication No. 2012-063151 describes previously deriving a correlation between velocities measured by using a plurality of antennas disposed away from each other and actual measurement values of a movement direction and a movement velocity of a mobile body. During the measurement, the movement direction and the movement velocity of the mobile body are calculated by using the velocities measured with the plurality of antennas and the previously derived correlation.

However, there is a need to install a plurality of receivers (antennas) in order to measure the movement direction and the movement velocity of the mobile body in the aforementioned conventional techniques. As a result, there is a problem that installation costs of the measuring equipment increases and the size of the measuring equipment also increases.

SUMMARY

The present technology provides a mobile body measurement device and a measurement method that are able to measure a movement direction and a movement velocity of a mobile body by using only one receiver.

A mobile body measurement device according to the present technology comprises: a single antenna that has directionality and that transmits a transmission wave toward a mobile body on the basis of a supplied transmission signal, and that receives a reflected wave reflected from the mobile body and generates a reception signal; a Doppler sensor that supplies the transmission signal to the antenna and generates a Doppler signal having a Doppler frequency on the basis of the reception signal supplied by the antenna; a signal intensity distribution data generating unit that generates signal intensity distribution data indicating a distribution of signal intensities in each frequency by performing frequency analysis on the Doppler signal obtained from the Doppler sensor; a velocity computing unit that detects Doppler frequency components corresponding to a movement velocity of the mobile body on the basis of the signal intensity distribution data and calculates a velocity on the basis of the detected Doppler frequency components; and a movement direction computing unit that calculates a movement direction from the velocities calculated by the velocity computing unit on the basis of a correlation between the movement direction of the mobile body and a differential between the velocity of the mobile body at a previously measured reference time and the velocity of the mobile body when a prescribed time period has elapsed after the reference time.

A mobile body measurement method according to the present technology involves: disposing a single antenna that has directionality and that transmits a transmission wave toward a mobile body on the basis of a supplied transmission signal, and that receives a reflected wave reflected from the mobile body and generates a reception signal; providing a Doppler sensor that supplies the transmission signal to the antenna and generates a Doppler signal having a Doppler frequency on the basis of the reception signal supplied by the antenna; providing a signal intensity distribution data generating unit that generates signal intensity distribution data indicating a distribution of signal intensities in each frequency performing frequency analysis on the Doppler signal obtained from the Doppler sensor; providing a velocity computing unit that detects Doppler frequency components corresponding to the movement velocity of the mobile body on the basis of the signal intensity distribution data and calculates a velocity on the basis of the detected Doppler frequency components; and calculating a movement direction from the movement velocity calculated by the velocity computing unit on the basis of a correlation between the movement direction of the mobile body and a differential between the velocity of the mobile body at a previously measured reference time and the velocity of the mobile body when a prescribed time period has elapsed after the reference time.

According to the present technology, a single antenna is provided that transmits a transmission wave toward a mobile body and receives a reflected wave reflected from the mobile body, and a movement direction is calculated from measured velocities on the basis of a correlation between the plurality of previously obtained velocities measured by using the antenna and actual measurement values of the movement direction.

Therefore, the movement direction and the movement velocity of a mobile body can be measured using a single antenna which is advantageous in reducing the cost and size of the measurement device.

DETAILED DESCRIPTION

First Embodiment

Figure 1:
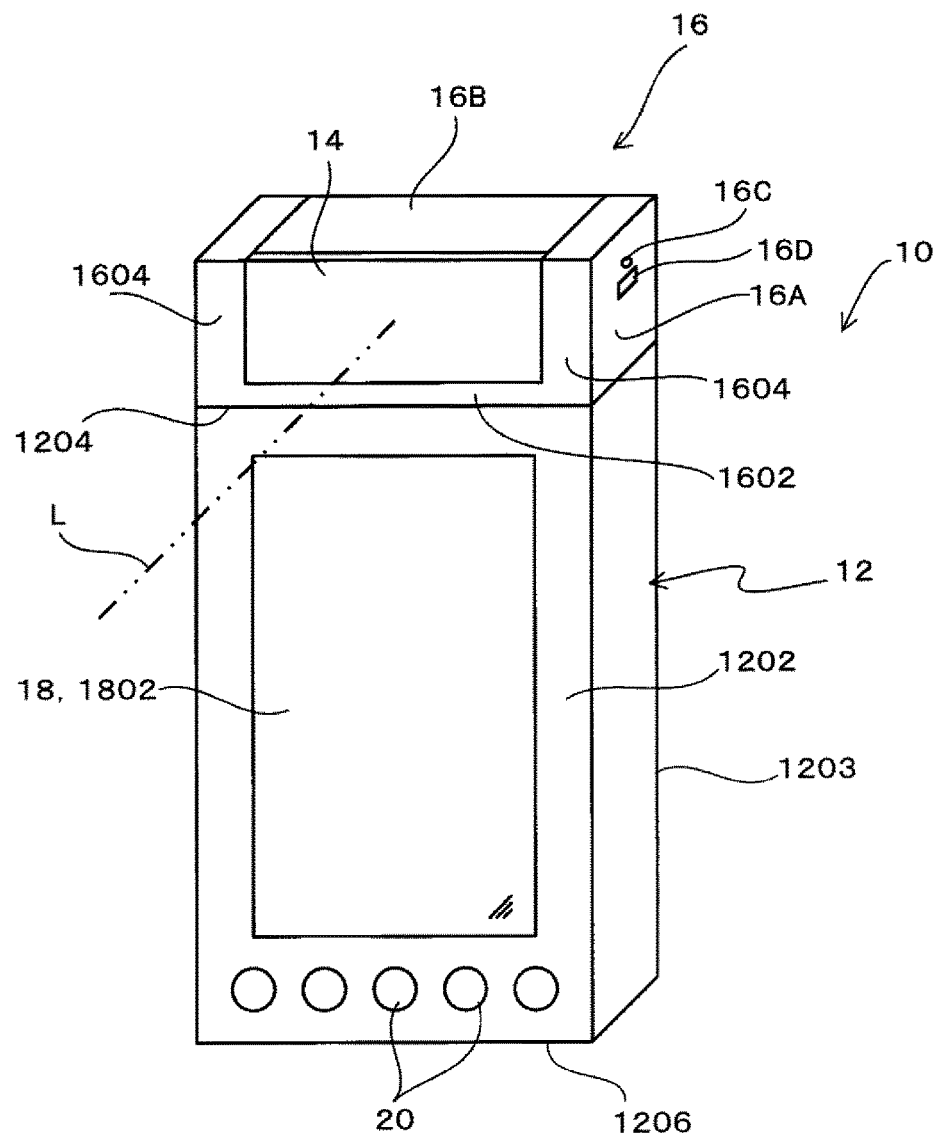
FIG. 1 is a perspective view of a visual appearance of a measurement device 10 according to an embodiment.

Next, embodiments of the present technology will be described while referring to the drawings.

In the present embodiment, the mobile body is a golf ball and the mobile body measurement device according to the present embodiment is described in the situation of measuring the movement direction and the movement velocity of the golf ball when struck by a golf club head. The mobile body may be a sports ball such as a baseball or a soccer ball or any mobile body that moves through space.

Figure 2:
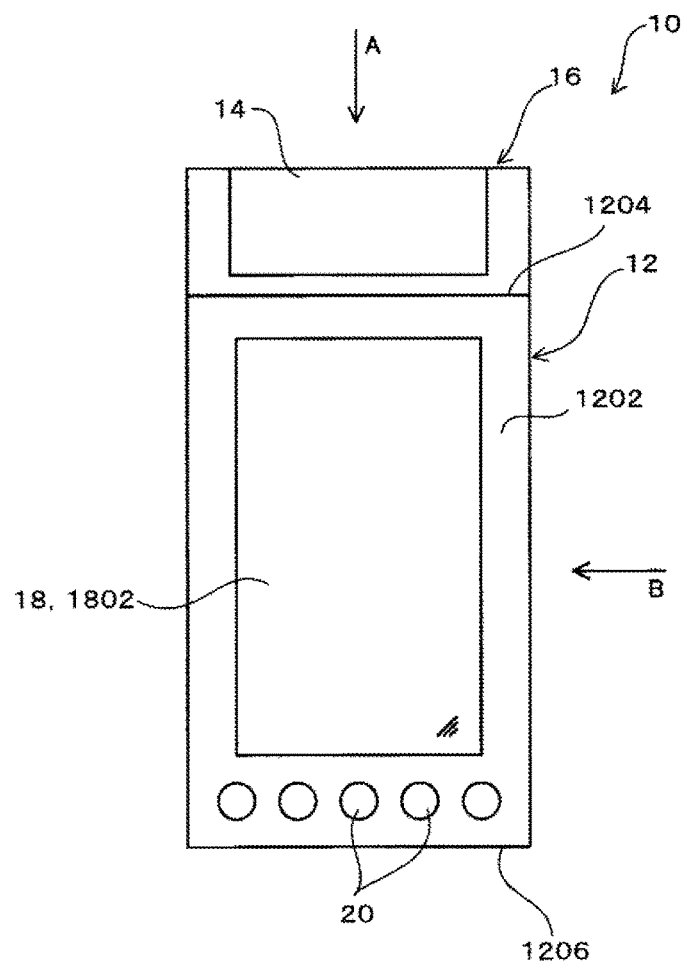
FIG. 2 is a front view of the measurement device 10.
Figure 3:
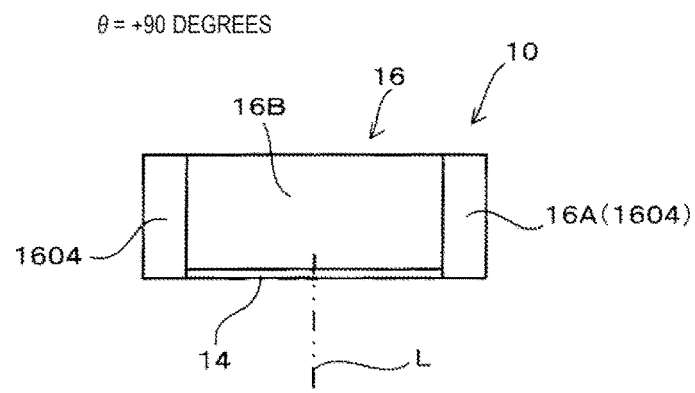
FIG. 3 is a view along arrow A of FIG. 2.

FIG. 1 is a perspective view of a visual appearance of a measurement device 10 according to the embodiment, and FIG. 2 is a front view of the measurement device 10.

As illustrated in FIG. 1, the mobile body measurement device 10 (hereinbelow referred to simply as the "measurement device 10") includes a housing 12, an antenna 14, an antenna supporting unit 16, a display unit 18, and an input unit 20.

The housing 12 has a thickness in an up-down direction, a width in a left-right direction of a greater dimension than the thickness, and a length in a front-back direction of a greater dimension than the width, and exhibits a rectangular plate shape.

An upper surface 1202 of the housing 12 exhibits a substantially rectangular shape in which the longitudinal direction is parallel to the front-back direction of the housing 12.

A front and back of the upper surface 1202 are each connected to a front surface 1204 and a rear surface 1206 of the housing 12.

A female screw (camera screw) that is not illustrated is provided on a lower surface 1203 that faces the upper surface 1202 for attaching the measurement device 10 to a fixture such as a tripod.

The antenna 14 is coupled to the upper surface 1202 of the housing 12 via the antenna supporting unit 16.

The antenna 14 has directionality and transmits a transmission wave toward the mobile body on the basis of a transmission signal supplied from a belowmentioned Doppler sensor 22 (see FIG. 6), and receives a reflected wave reflected from the mobile body and generates a reception signal which is supplied to the Doppler sensor 22.

In the present specification, an imaginary line extending along a direction in which a gain of the antenna 14 is maximized is defined as an imaginary axis L that indicates an orientation direction of the antenna.

In this embodiment, the antenna 14 is configured by a patch antenna of a rectangular plate shape and is a top surface where one surface in a thickness direction transmits the transmission wave and receives the reflected wave, and an opposite side of the top surface is a rear surface.

The use of a patch antenna as the antenna 14 is advantageous in that the measurement device 10 can be made more compact. However, various conventionally known antennas such as a horn antenna can be used as the antenna 14.

Note that if an orientation angle of the antenna 14 is too narrow, there is a disadvantage where a measurement range of the mobile body is limited, and if the orientation angle of the antenna 14 is too wide, unnecessary reflected waves are received from objects other than the mobile body to be measured, which is disadvantageous in ensuring measurement accuracy.

Because of this, it is advantageous to make the orientation angle of the antenna 14 be from 5 to 90 degrees to ensure the measurement range of the mobile body and to suppress reception of unnecessary reflected waves from objects other than that to be measured.

The antenna supporting unit 16 is provided on the housing 12 and supports the antenna 14 so that an inclination of the imaginary axis L can be varied.

In this embodiment, the antenna supporting unit 16 is provided with a frame 16A and a case 16B.

The frame 16A is configured by a base portion 1602 that is provided on the front surface 1204 of the housing 12 and that extends in a width direction of the housing 12, and two pillar portions 1604 erected forward from both ends of the base portion 1602.

The case 16B exhibits a rectangular plate shape slightly smaller than a contour of the antenna 14 when viewed from above and is attached to a back surface of the antenna 14 in a state where four sides of the case 16B are parallel to four sides of the antenna 14.

More specifically, the case 16B has a bottom wall of a rectangular plate shape opposing the antenna 14 and four side walls erected from the bottom wall, and an upper portion of these four side walls is connected to the back surface of the antenna 14. Moreover, the Doppler sensor 22 that will be described below is housed in a housing space surrounded by the bottom wall, the four side walls, and the antenna 14.

An integrated module that is provided in an integrated manner with the antenna 14 and the Doppler sensor 22 may also be used. In this situation, the Doppler sensor 22 is provided in an integrated manner on the back surface of the antenna 14.

By using an integrated module in this way, there is an advantage that noise added to the signal can be reduced by reducing the distance of the signal path between the antenna 14 and the Doppler sensor 22, and there is a further advantage in that the measurement device 10 can be made more compact.

Note that the Doppler sensor 22 may be housed in the housing 12.

The case 16B has two opposing side walls out of the four disposed between the two pillar portions 1604 and is rotatably supported by the two pillar portions 1604 via a support shaft 16C whose axis corresponds to the left-right direction of the housing 12.

Therefore, the antenna supporting unit 16 supports the antenna 14 so that the inclination of the imaginary axis L can be altered.

Figure 4:
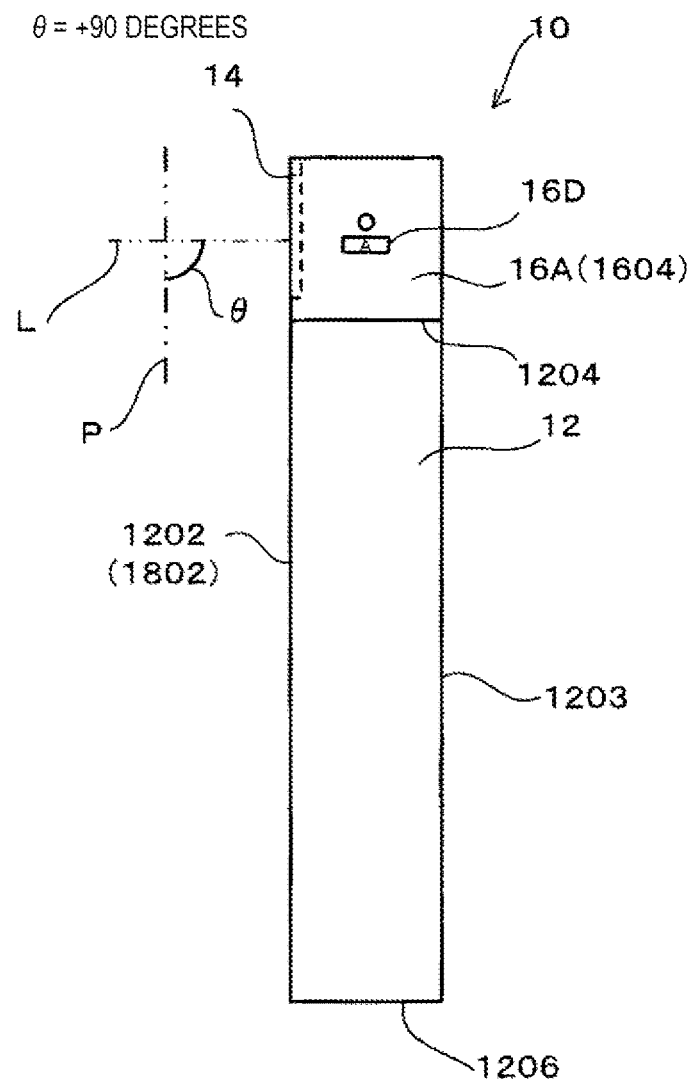
FIG. 4 is a view along arrow B of FIG. 2.

In the present specification, as illustrated in FIG. 4, an angle that is formed by the imaginary axis L and an imaginary plane P, which is parallel to a display surface 1802 of a display unit 18 that will be described below, is defined as an antenna angle $\theta$. In this embodiment, the antenna supporting unit 16 supports the antenna 14 so that the antenna angle $\theta$ changes in a range of $\pm 90$ degrees. That is, the antenna angle $\theta$ changes in a range of 180 degrees. Note that an adjustment range of the antenna angle $\theta$ is not limited to 180 degrees, and the adjustment range may be set to any range.

Figure 5:
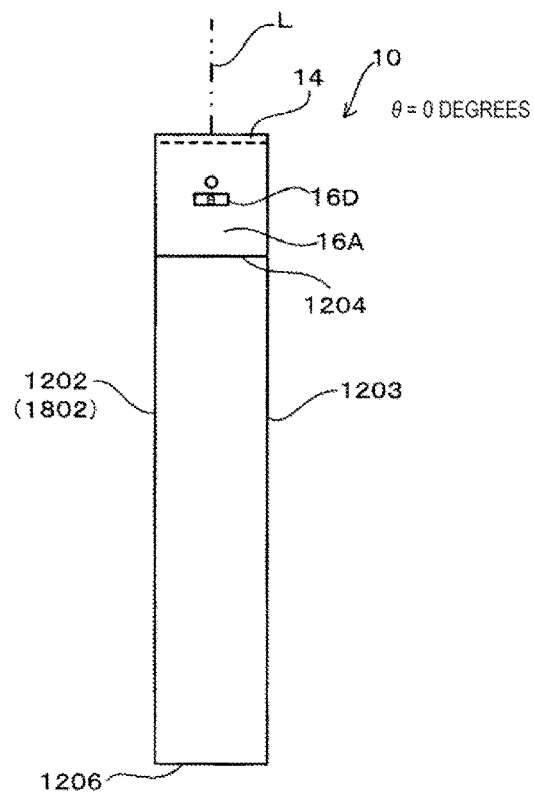
FIG. 5 illustrates the state of an antenna rotated 90 degrees in FIG. 4.

Here, as illustrated in FIG. 4, the antenna angle $\theta$ equals +90 degrees in a state where the imaginary axis L faces above the housing 12; as illustrated in FIG. 5, the antenna angle $\theta$ equals 0 degrees in a state where the imaginary axis L faces the front of the housing 12; and the antenna angle $\theta$ equals -90 degrees in a state where the imaginary axis L faces the rear of the housing 12; therefore, the adjustment range of the antenna angle $\theta$ is $\pm 90$ degrees.

Note that in this embodiment, a situation where the antenna supporting unit 16 rotatably supports the antenna 14 around a single support shaft 16C is described, but it is sufficient that the antenna supporting unit 16 is able to support the antenna 14 so that the inclination of the imaginary axis L can be varied, and various conventionally known mechanisms can be used as the antenna supporting unit 16.

For example, the antenna supporting unit 16 may be configured to support the antenna 14 in a rotatable manner around two support shafts by providing a separate support shaft that extends horizontally orthogonal to the support shaft 16C. This is more advantageous in ensuring degrees of freedom in adjusting the inclination of the imaginary axis L of the antenna 14.

The antenna supporting unit 16 of the present embodiment is provided with a click mechanism for holding the antenna 14 at a predetermined plurality of antenna angles $\theta$ such as three angles of +90 degrees, 0 degrees, and -90 degrees. By this, a setting operation for the predetermined plurality of antenna angles $\theta$ is made easier.

Moreover as illustrated in FIGS. 4 and 5, an angle display unit 16D for indicating to which of the plurality of antenna angles $\theta$ the antenna is set is provided on the antenna supporting unit 16 in the present embodiment. As a result, confirmation of the antenna angle $\theta$ is made easier.

The angle display 16D is configured by a window portion provided on one of the pillar portions 1604 and an indicator provided on a location on the case 16B.

The indicator is formed by symbols such as A, B, and C; numbers; or scale marks on locations on the case 16B corresponding to where the antenna angle $\theta$ is +90 degrees, 0 degrees, and -90 degrees.

When the antenna angle $\theta$ of the antenna 14 is switched to +90 degrees, 0 degrees, and -90 degrees, the A, B, or C indicators formed on the location of the case 16B are selectively exposed through the window portion whereby the position of the antenna 14 at any of the plurality of antenna angles $\theta$ is indicated.

Note that various conventionally known display mechanisms can be used as such an angle display 16D.

The gain distribution (directional characteristic) of the antenna 14 is preferably set as described below when a golf ball 2 is assumed to be the mobile body and the antenna 14 is disposed in a location 1 m away to the rear of a movement starting position O as seen in a plan view.

An imaginary line extending along a direction in which a gain of the antenna 14 is maximized is defined as the imaginary axis L that indicates the orientation direction of the antenna 14.

The gain on the imaginary axis L is maximized, an angle in which the gain is reduced by 3 dB within a horizontal plane that includes the imaginary axis is set to a horizontal angle, and an angle in which the gain is reduced by 3 dB within a vertical plane that includes the imaginary axis is set to a vertical angle.

The horizontal angle is preferably 10 degrees or more. There is a disadvantage in that an insufficient measuring range cannot be ensured if the horizontal angle falls below the above range. The horizontal angle is 32 degrees in the present embodiment.

The vertical angle is preferably 120 degrees or less. There is an advantage in that the presumed range within which the golf ball is hit can be measured with sufficient sensitivity within the above range. The vertical angle is 80 degrees in the present embodiment.

Figure 7:
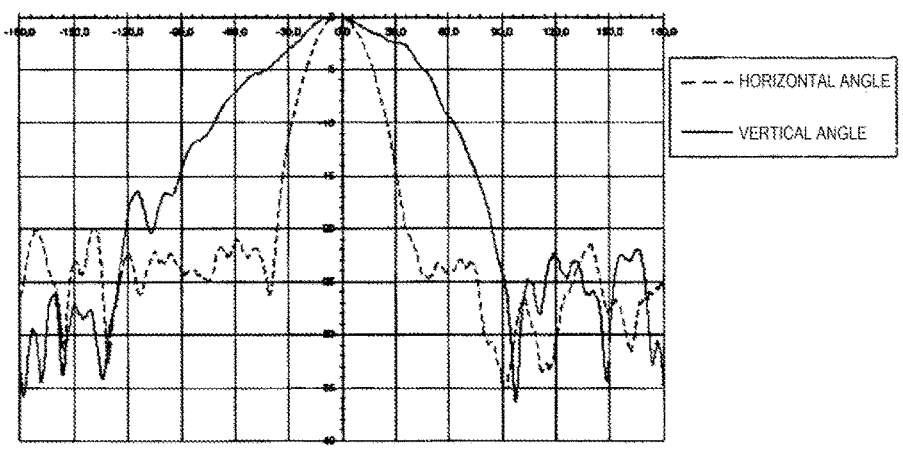
FIG. 7 is a graph depicting gain distribution of an antenna 14.

FIG. 7 is a graph depicting a gain distribution of the antenna 14 used in the present embodiment. The vertical axis of the graph depicted in FIG. 7 represents the gain reduction amount from the maximum value (gain on the imaginary axis L) of the gain, and the horizontal axis represents an angle when the imaginary axis L is 0 degrees. As mentioned above, the gain distribution of the antenna 14 has a horizontal angle of 23 degrees and a vertical angle of 80 degrees.

When the golf ball 2 is used as the mobile body as in the present embodiment, the ratio between the wide side of the gain distribution and the narrow side of the gain distribution for the antenna 14 is preferably 1.5 to 5.

Figure 8:
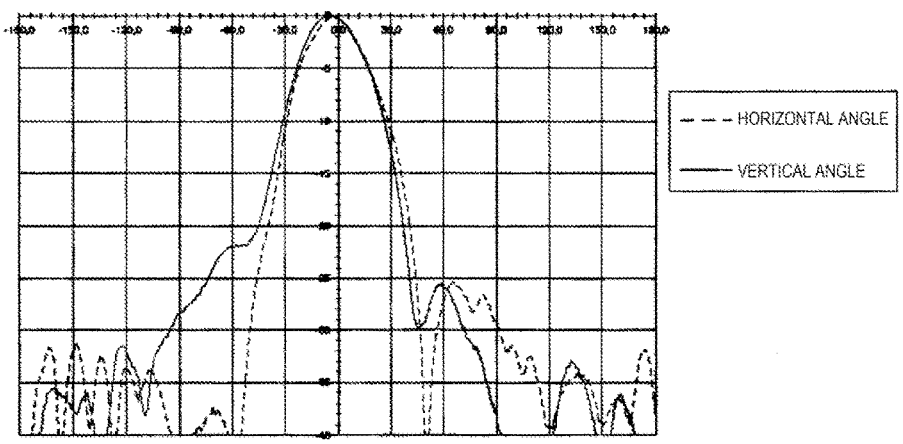
FIG. 8 is a graph depicting an example of gain distribution of another antenna.

FIG. 8 is a graph depicting an example of gain distribution of another antenna. The vertical axis of the graph depicted in FIG. 8 represents the gain reduction amount from the maximum value of the gain, and the horizontal axis represents an angle when the imaginary axis L is 0 degrees. The gain distribution of the antenna in FIG. 8 is substantially the same in the horizontal angle and the vertical angle. An antenna having such a gain distribution is best used when there is a need for an equivalent evaluation of the horizontal angle and the vertical angle such as when the movement starting point and the target of the mobile body are on the same plane.

Figure 9:
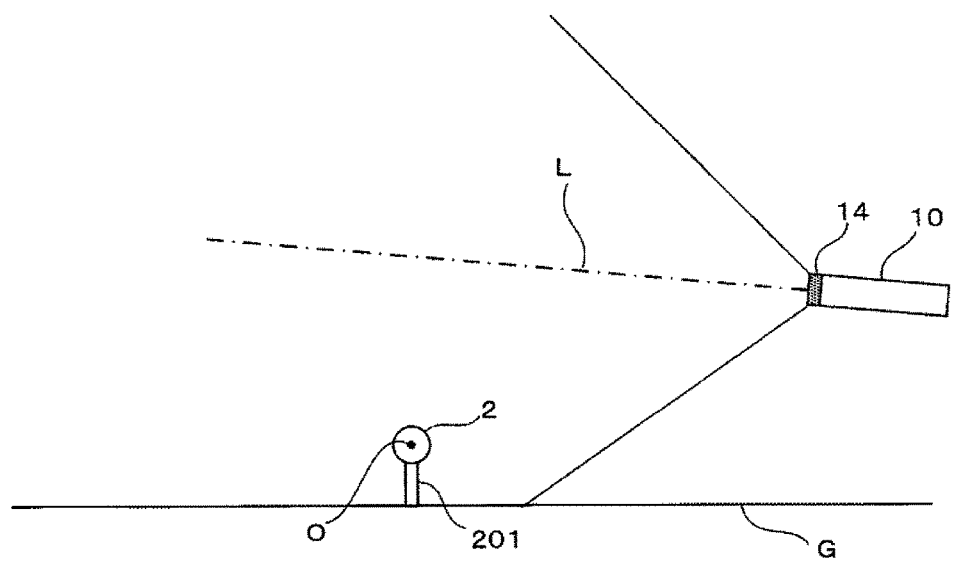
FIG. 9 is an explanatory view seen in a side view of the antenna 14.
Figure 10:
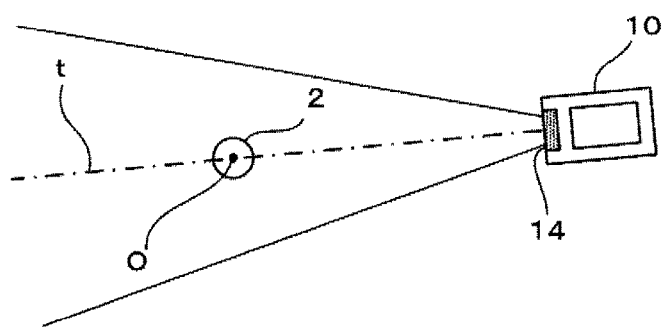
FIG. 10 is an explanatory view seen in a plan view of the antenna 14.

As illustrated in FIGS. 9 and 10, the antenna 14 is provided in a location to the rear of the golf ball 2 in relation to the movement direction of the golf ball 2. The position of the antenna 14 according to the present embodiment is in a spot 1 m to the rear from the position (e.g., the movement starting spot of the mobile body) of the golf ball 2. The reference numeral 201 in FIG. 9 represents a tee on which the golf ball 2 is placed, and the reference numeral G represents the ground (horizontal plane).

As seen in a plan view, the center of the golf ball 2 placed on the tee 201 is disposed on the imaginary axis L of the antenna 14 in the left-right direction. The center is set as the movement starting position O (or the origin O, e.g., the movement starting position of the mobile body). As a result, the movement of the golf ball 2 in the left-right direction can be considered to be movement along the imaginary axis L. That is in the present embodiment, the position of the golf ball 2 in the left-right direction is set on the imaginary axis L and only the position in the up-down direction is calculated.

Returning to the explanation of FIG. 1, the display unit 18 is provided on the upper surface 1202 of the housing 12 so that the flat and rectangular display surface 1802 faces upward, and a major portion of the upper surface 1202 is occupied by the display surface 1802.

In this embodiment, the display surface 1802 exhibits a rectangular shape whose length along the front-back direction of the housing 12 is longer than a width along the left-right direction of the housing 12.

The display unit 18 displays various display contents that are measurement results such as the movement velocity and rotation speed of the mobile body on the display surface 1802 with numbers, symbols, or icons and the like.

As such a display unit 18, a flat panel display such as a liquid crystal panel can be used.

The input unit 20 is provided in a location near the rear surface 1206 of the upper surface 1202.

The input unit 20 in the present embodiment is configured by plurality of operating buttons such as a mode selection button and a power button and the like. The abovementioned display unit 18 may be a touch panel display and the input unit 20 may be combined with the display unit 18.

The power button is a button for turning the power on and off.

The mode selection button is a button for selecting a measurement mode of the measurement device 10. Any of a golf mode, a bat mode, or a ball mode can be selected as the measurement mode of the measurement device 10 in the present embodiment. The golf mode is a mode for measuring the hit velocity of a golf ball hit by a golf club. The bat mode is a mode for measuring the hit velocity of a baseball hit by a baseball bat. The ball mode is a mode for measuring the throwing velocity of a baseball thrown by a pitcher.

Figure 6:
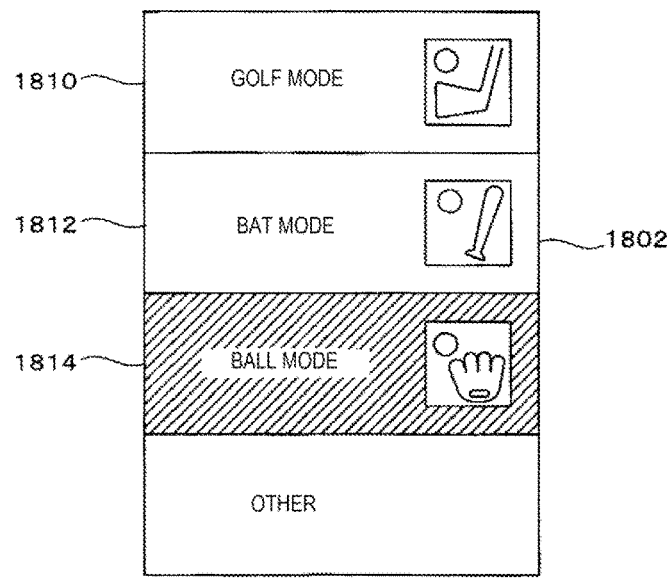
FIG. 6 is an explanatory view of an example of a selection screen for measurement modes.

FIG. 6 is an explanatory view of an example of a selection screen for measurement modes. A golf mode selecting unit 1810, a bat mode selecting unit 1812, and a ball mode selecting unit 1814 are displayed as the measurement modes on the display surface 1802 of the measurement device 10 in FIG. 6. In FIG. 6, the ball mode selecting unit 1814 is selected and is displayed in a different color than the other selecting units. A user is able to set a measurement mode by selecting any of the selecting units and carrying out the determined operations.

Note that various conventionally known display formats can be used as the measurement mode selection screen. A display does not necessarily accompany the selection of a measurement mode and various conventional selection formats can be used.

While the posture of the housing 12 when using the measurement device 10 is not limited in particular, normally the posture is set as either (1) a posture where the upper surface 1202 (display surface 1802) of the housing 12 faces upward, or (2) a posture where the front surface 1204 of the housing 12 faces upward and the upper surface 1202 (display surface 1802) faces to the side, and the antenna angle θ is adjusted so that the imaginary axis L of the antenna 14 matches the movement direction of the mobile body.

The measurement device 10 is also provided with a battery (not illustrated) for accumulating electrical power, and the measurement device 10 may be driven by using the electrical power accumulated in the battery. As a result, the measurement device 10 can be installed near the user without becoming a hindrance when throwing a ball and the like.

Figure 11:
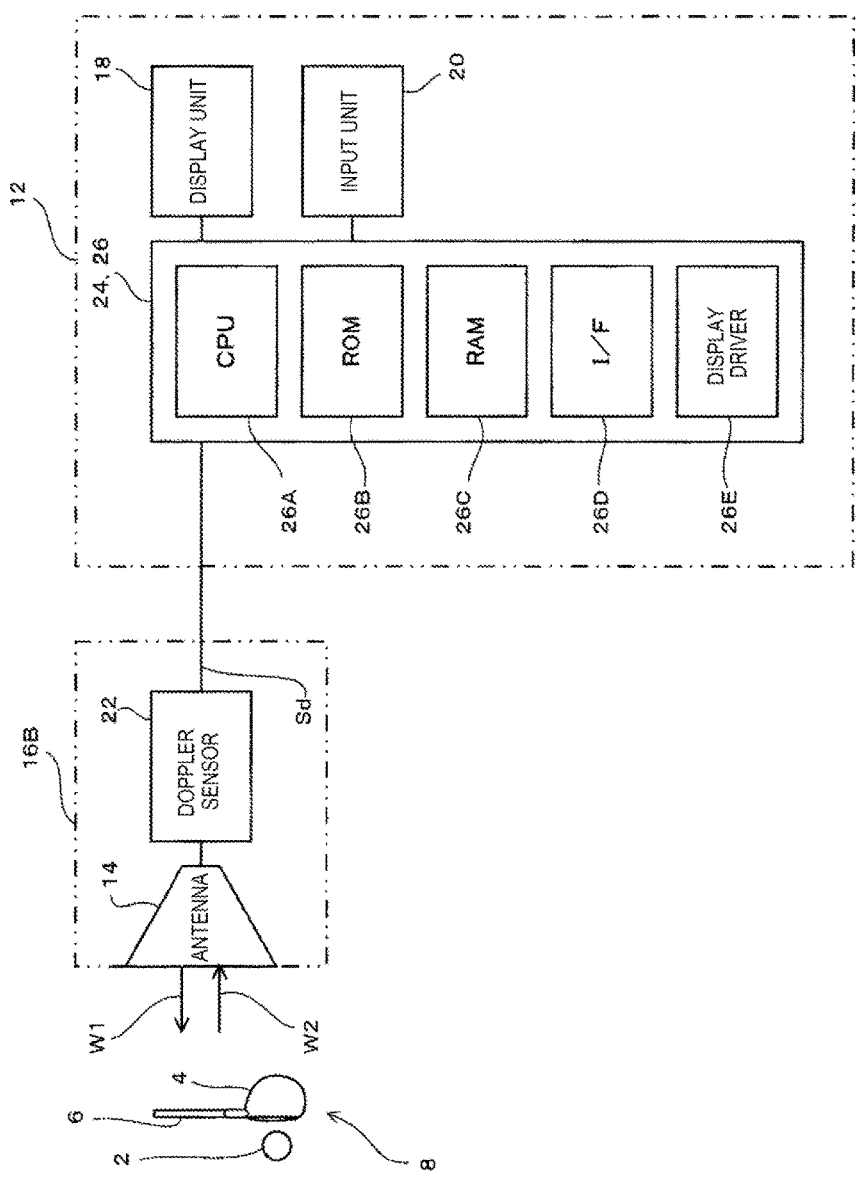
FIG. 11 is a block diagram illustrating a configuration of the measurement device 10.

A configuration of the control system of the measurement device 10 will be explained next with reference to FIG. 11. FIG. 11 is a block diagram illustrating a configuration of the measurement device 10.

The reference numeral 2 in FIG. 11 represents a golf ball as the mobile body, the reference numeral 4 represents a golf club head, the reference numeral 6 represents a shaft, and the reference numeral 8 represents a golf club.

The measurement device 10 is configured to include a Doppler sensor 22 and a measurement processing unit 24 in addition to the antenna 14, the display unit 18, and the input unit 20.

The Doppler sensor 22 is connected to the antenna 14 with a cable that is not illustrated and supplies transmission signals to the antenna 14 through the cable. The Doppler sensor 22 generates as time series data a Doppler signal Sd having a Doppler frequency Fd based on respective reception signals supplied from the antenna 14.

The Doppler signal Sd is a signal a Doppler frequency Fd defined by a frequency F1-F2 which is a difference between a frequency F1 of the transmission signal and a frequency F2 of the reception signal.

Various commercially available sensors can be used as a Doppler sensor 22.

Note that as the transmission signal, a microwave of 24 GHz or 10 GHz can be used, for example, and the frequency of the transmission signal is not limited if able to obtain the Doppler signal Sd.

The output of the transmission wave is for example 10 mW or less. The reason for this is that if the measurement device is battery-driven, the usable time period can be increased and the power consumption can preferably be reduced as much as possible. The electrical power consumed by transmitting the transmission wave from the antenna 14 is very large in the measurement device 10. By making the output of the transmission wave 10 mW or less for example in this way, the power consumption can be reduced and the usable time period of the measurement device 10 when driven by the battery can be increased.

The measurement processing unit 24 calculates the movement direction and the movement velocity of the golf ball 2 by performing an arithmetic operation upon receiving the Doppler signal Sd supplied from the Doppler sensor 22.

In this embodiment, the measurement processing unit 24 is configured by a microcomputer 26.

The microcomputer 26 includes a CPU 26A, and a ROM 26B, a RAM 26C, an interface 26D, and a display driver 26E and the like connected via an interface circuit and a bus line which are not illustrated.

The ROM 26B stores a control program or the like executed by the CPU 26A for calculating the movement direction and the movement speed of the mobile body, and the RAM 26C provides a working area.

The interface 26D receives the Doppler signal Sd and supplies the same to the CPU 26A and receives an operation signal from the input unit 20 and supplies the same to the CPU 26A.

The display driver 26E drives the display unit 18 based on a control by the CPU 26A.

Figure 12:
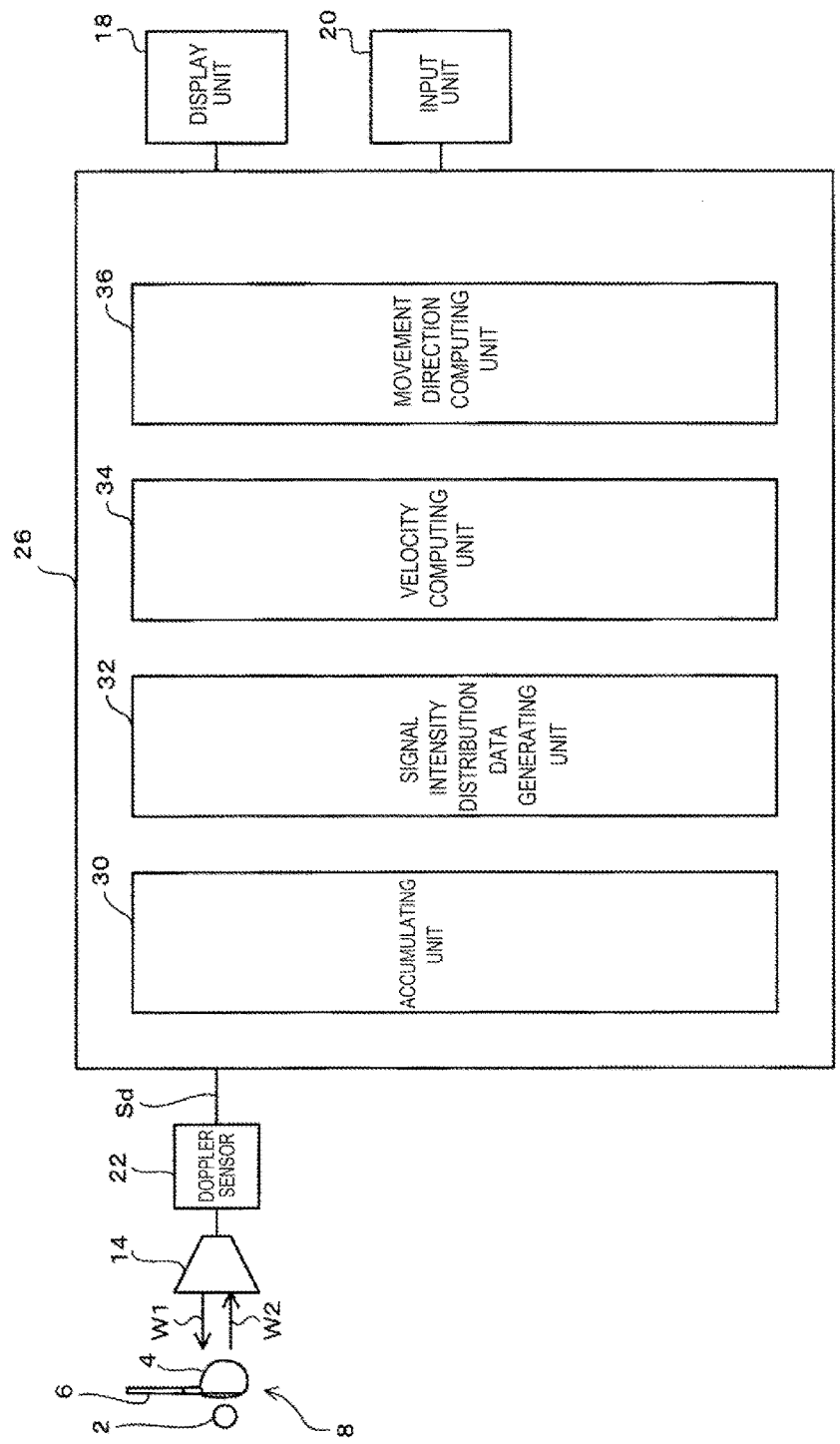
FIG. 12 is a functional block diagram of the measurement device 10.

FIG. 12 is a block diagram of the measurement device 10 depicting the functional blocks of the microcomputer 26.

The microcomputer 26 is functionally configured to include an accumulating unit 30, a signal intensity distribution data generating unit 32, a velocity computing unit 34, and a movement direction computing unit 36.

The accumulating unit 30, the signal intensity distribution data generating unit 32, the velocity computing unit 34, and the movement direction computing unit 36 are realized by the CPU 26A executing the control programs; however portions of the above units may be configured by hardware such as circuits.

The accumulating unit 30 accumulates the Doppler signals Sd with a predetermined sampling period in order according to the passage of time.

In the present embodiment, the CPU 26A samples the Doppler signals Sd with the sampling period and stores the Doppler signals Sd as sampling data of the Doppler signals Sd in the RAM 26C.

The accumulating unit 30 starts the sampling operation at the same time as the power of the measurement device 10 is turned on for example.

Figure 13:
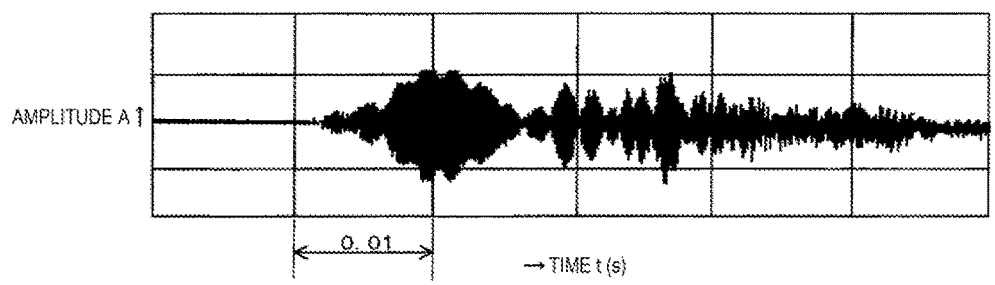
FIG. 13 is a diagram of an example of a Doppler signal Sd when a golf ball 2 is struck by a golf club head 4.

FIG. 13 is a diagram of an example of a Doppler signal Sd when the golf ball 2 is struck by the golf club head 4, and the horizontal axis represents time t (s) and the vertical axis represents an amplitude (optional units).

In FIG. 13, the first waveform portion exhibiting the large amplitude depicts the portion of the Doppler signal generated by the golf club head 4, and the subsequent waveform portion depicts the portion of the Doppler signal generated by the struck golf ball 2.

Returning to the explanation with regard to FIG. 12, the signal intensity distribution data generating unit 32 generates signal intensity distribution data by performing frequency analysis (continuous FFT analysis or wavelet analysis) of the sampling data of the Doppler signals Sd accumulated in the accumulating unit 30.

In other words, the signal intensity distribution data generating unit 32 generates the signal intensity distribution data which indicates the distribution of the signal intensity for each frequency by performing frequency analysis on the Doppler signals Sd obtained from the Doppler sensor 22.

The signal intensity distribution data generating unit 32 in the present embodiment specifies predetermined segments of the sampling data of the Doppler signal Sd that is time series data accumulated in the accumulating unit 30 to generate the signal intensity distribution data. The sampling data segments for the Doppler signal Sd in this case are specified on the basis of a predetermined measured time period.

In other words, the signal intensity distribution data generating unit 32 generates the signal intensity distribution data by specifying the sampling data in fixed segments after powering up the measurement device 10 among the sampling data of the Doppler signals Sd accumulated according to an uncontrolled discharge system.

The following method exemplifies a method for specifying the sampling data in the predetermined segments.

That is, the signal intensity distribution data generating unit 32 generates the signal intensity distribution data by excluding sampling data counted from a reference time point to the ath time using the time that the measurement device 10 was powered up as the reference time point, and specifies the sampling data from the a+1th time to the bth time (where a<b).

In this case, the above numerical values a and b are set so that data affected by the golf club head 4 is not included in the sampling data from the a+1th time to the bth time (where a<b).

The setting of the numerical values a and b is performed on the basis of a prescribed reference time TS and an elapsed time TP after a predetermined time period ΔT has elapsed after the reference time TS. The reference time TS is determined as a predicted time measured when the golf ball 2 moves about 0.5 m from the movement starting position O, and the elapsed time TP is determined as a predicted time when the golf ball 2 moves about 2 m from the movement starting position O in the present embodiment. That is, the signal intensity distribution data generating unit 32 specifies the reference time TS and the elapsed predetermined time period ΔT after the reference time TS based on the time the measurement device 10 was powered up, and generates the signal intensity distribution data between the reference time TS and the elapsed predetermined time period ΔT after the reference time TS.

A plurality of elapsed times TP may be determined, without being limited to one time, so that the velocity can be measured in equal intervals along the movement path of the golf ball 2. According to the present embodiment for example, a first elapsed time TP1 is a predicted time when the golf ball 2 moves about 2 m, and a second elapsed time TP2 is a predicted time when the golf ball 2 moves about 3.5 m and so on.

That is, the reference time is the predicted time when the mobile body moves a prescribed distance (0.5 m in the present embodiment) away from the movement starting spot, and the prescribed time period ΔT is the predicted time period when the mobile body reaches a spot which is spaced away by an integral multiple of a prescribed reference distance (e.g., 1.5 m) from a prescribed distance. The spot spaced away from the movement starting spot by the prescribed distance, that is the predicted spot that the mobile body will reach in the reference time, is referred to as a "reference spot", and the spot spaced away from the movement starting spot by an integral multiple of the prescribed distance, that is the predicted spot that the mobile body will reach after the prescribed time period (ΔT) has elapsed, is referred to as the "post-movement spot".

The numerical values a and b may be set in consideration of variation of the golf club head 4 speed when the golf club 6 is actually swung.

Alternatively, the sampling data may be specified in a predetermined segment so that data affected by the golf club head on the basis of the elapsed time is not included using the power-up time of the measurement device 10 as the reference time point.

Figure 14:
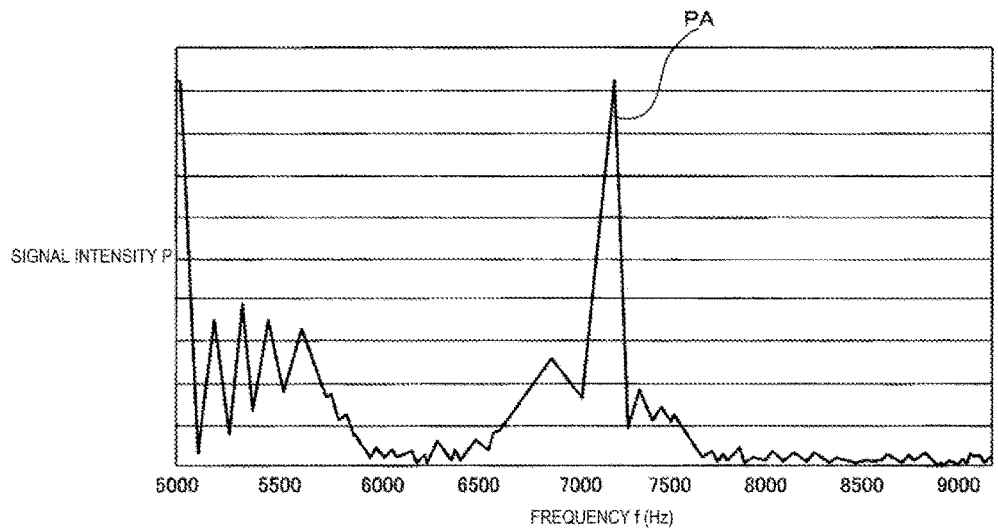
FIG. 14 is a diagram of an example of signal intensity distribution data PA generated by a signal intensity distribution data generating unit 32.

FIG. 14 is a diagram of an example of signal intensity distribution data PA generated by the signal intensity distribution data generating unit 32, and the horizontal axis represents the frequency f (Hz) and the vertical axis represents the signal intensity P (optional units).

The portion in which the signal intensity P is high in the region where the frequency f is low corresponds to a reflected wave W2 from the golf club head 4 and the portion where the signal intensity peaks thereafter corresponds to a reflected wave W2 from the struck golf ball 2 in FIG. 14.

Returning to the explanation in FIG. 12, the velocity computing unit 34 detects Doppler frequency components corresponding to the movement velocity of the golf ball 2 on the basis of the signal intensity distribution data PA, and calculates a velocity V on the basis of the detected Doppler frequency components.

A method for detecting the Doppler frequency components from the signal intensity distribution data PA is exemplified by the following procedures.
(1) Obtaining the signal intensity distribution data in which the effect of noise is suppressed by taking a movement average for the signal intensity distribution data PA.
(2) Detecting a peak value of the signal intensity or a frequency corresponding to the center value of the peak of the signal intensity in the signal intensity distribution data PA from which the movement average is taken, as the Doppler frequency components (Doppler frequency).

The method for detecting the Doppler frequency components may involve detecting by suppressing noise included in the signal intensity distribution data PA to correct and stabilize the Doppler frequency components, and the method is not limited to the above procedures.

The following is an explanation of the principle for measuring velocity of the golf ball 2.

As known conventionally, the Doppler frequency Fd is expressed by Equation (1).

$$Fd = F1 - F2 = 2 \cdot V \cdot F1/c \tag{1}$$

where V: velocity of golf ball 2, c: speed of light (3·108 m/s)

Thus, the following equation (2) is arrived at by solving V in equation (1).

$$V = c \cdot Fd/(2 \cdot F1) \tag{2}$$

In other words, a velocity V of the golf ball 2 is proportional to the Doppler frequency Fd.

Therefore, the frequency components of the Doppler frequency Fd can be detected from the Doppler signal Sd and the velocity V of the golf ball 2 can be derived on the basis of equation (2) from the detected Doppler frequency components.

Note that the movement velocity of the golf ball 2 obtained from equation (2) is a velocity component in the direction matching the imaginary axis L that indicates the directionality of the antenna 14.

Therefore, there is a tendency for an error in the movement velocity of the golf ball 2 obtained from equation (2) to increase as the movement path of the golf ball 2 deviates from the imaginary axis L that indicates the antenna directionality.

Figure 15A:
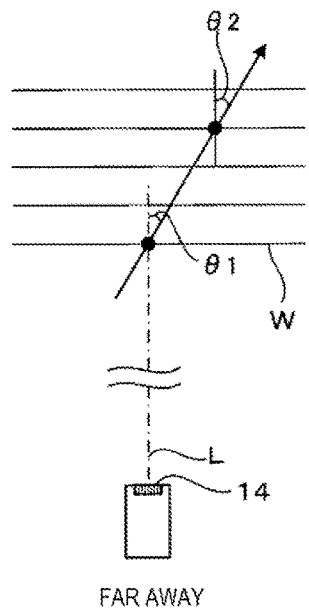
FIGS. 15A and 15B are explanatory views of a positional relationship between a wave front of a transmission wave transmitted by the antenna 14 and a movement direction of a mobile body.

More specifically as illustrated in FIG. 15A, the movement velocity of the moving mobile body having the angle with respect to the imaginary axis L that indicates the directionality of the antenna 14 is measured to a degree that is cos θ slower than the actual movement velocity.

Figure 15B:
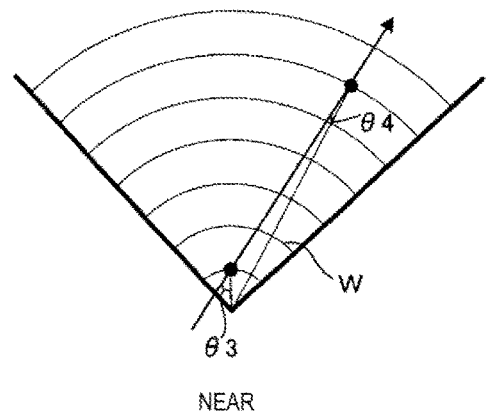

FIGS. 15A and 15B are explanatory views of the positional relationship between a wave front of the transmission wave transmitted by the antenna 14 and the movement direction of the mobile body. As illustrated in FIG. 15A, the transmission wave generally becomes a horizontal wave (more specifically, a horizontal wave having a wave front W perpendicular to the imaginary axis L) if the mobile body is positioned far enough away from the antenna 14. That is, the normal direction of the wave front W of the transmission wave transmitted from the antenna 14 always matches the imaginary axis L. As a result, the angle θ between the movement direction of the mobile body moving in a fixed direction and the normal direction of the wave front W is always fixed (θ1=θ2 in FIG. 15A). As a result, the error (delay) of the movement velocity of the mobile body is always fixed.

Conversely as illustrated in FIG. 15B, the transmission wave becomes a spherical wave (more specifically, a spherical wave centered on the position of the antenna 14) if the mobile body is positioned near the antenna 14. That is, the normal direction of the wave front W of the transmission wave transmitted from the antenna 14 varies according to the position. Consequently, the angle θ between the movement direction of the mobile body moving in a fixed direction and the normal direction of the wave front W varies depending on the position (θ3≠θ4 in FIG. 15B), and as a result the movement velocity of the mobile body is measured having an error (delay) that varies depending on the position of the mobile body.

Accordingly, the present technology focuses on a correlation between the measured movement direction of the golf ball 2 and a differential ΔV between a velocity VS at the reference time TS and a velocity VP when the prescribed time period ΔT has elapsed (elapsed time TP) after the reference time TS.

That is, if the abovementioned correlation is obtained beforehand, the movement direction of the golf ball 2 can be derived from the velocities VS and VT on the basis of the correlation.

The movement direction computing unit 36 calculates the movement direction from the velocity VS at the reference time and from the velocity VP when the prescribed time ΔT period has elapsed after the reference time, on the basis of the correlation between the differential ΔV of the velocities obtained through actual previous measurements and the movement direction of the golf ball 2 obtained through actual previous measurements.

The movement direction of the golf ball 2 is defined in the present embodiment as described below.

Figure 16:
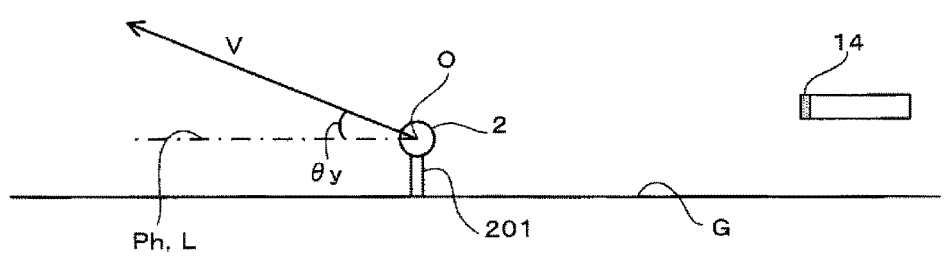
FIG. 16 is an explanatory view of the golf ball 2 and the antenna 14 as seen in a side view.
Figure 17:
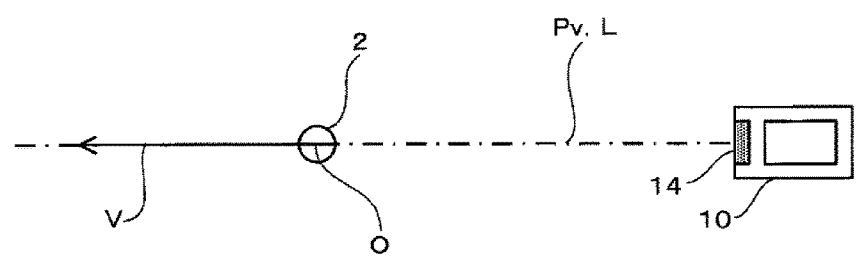
FIG. 17 is an explanatory view of the golf ball 2 and the antenna 14 as seen in a plan view.

A reference vertical plane Pv including an imaginary line CL that passes through the movement starting position O, and a reference horizontal plane Ph orthogonal to the reference vertical plane Pv and that passes through the movement starting position O are set as illustrated in FIGS. 16 and 17.

In other words, a plane that extends in the vertical direction and includes the imaginary line CL that extends in the horizontal direction through the predetermined movement starting position O is established as the reference vertical plane Pv. A plane that passes through the movement starting position O and that is orthogonal to the reference vertical plane Pv is established as the reference horizontal plane Ph.

An angle formed between a projected movement path when the movement path of the golf ball 2 is projected on the reference vertical plane Pv and the reference horizontal plane Ph (imaginary line CL) is established as an up-down angle θy.

An angle formed between a projected movement path when the movement path of the golf ball 2 is projected on the reference horizontal plane Ph and by the reference vertical plane Pv is established as a left-right angle θx.

It is assumed here that the golf ball 2 is struck from the tee toward a target spot without deviation in the left-right direction. As a result, the left-right angle θx is always 0 and the movement direction of the golf ball 2 is defined as the up-down angle θy in the present embodiment.

That is, the movement direction calculated by the movement direction computing unit 36 is expressed in the up-down direction among the up-down angle and the left-right angle. As described above, the gain distribution of the antenna 14 differs according to the up-down angle and the left-right angle, and in the present embodiment, an installation is made so that the wide side of the gain distribution of the antenna 14 becomes the up-down angular direction.

In the present embodiment, the up-down angle θy is calculated on the basis of the correlation between the differential ΔV of the two velocities measured at the prescribed reference time TS and the elapsed time TP, and the actually measured up-down angle θy of the golf ball 2.

More specifically, a calculation is made of the differential ΔV of the velocities VS and VP measured at the prescribed reference time TS and the elapsed time TP.

A calculation is also made of the up-down angle θy from the differential ΔV on the basis of the correlation between the differential ΔV obtained from previous actual measurements and the actually measured up-down angle θy of the golf ball 2.

By calculating the up-down angle θy from an average value of the differential of a plurality of velocities obtained at a plurality of times in this way, the movement direction and the movement velocity of the mobile body can be measured using one antenna 14.

The following is an explanation on acquiring the correlation between the actually measured ΔV and the actually measured movement direction of the golf ball 2.

First, the golf ball 2 positioned at the movement starting position O is struck in various velocities and directions by a dedicated golf ball hitting device (swing robot). In other words, the striking is performed to provide different up-down angles θy and movement velocities Vα.

Actual measurement data of the up-down angles θy and the differential ΔVα of the velocities is acquired by measuring the up-down angles θy and the movement velocities Vα of the golf ball 2 using a reference measurement apparatus that can measure the movement direction and the movement velocity of a mobile body with high accuracy.

Various conventional measurement devices such as the measurement device disclosed in Japanese Patent No. 4104384B for example may be used as the reference measurement apparatus.

The velocities VS and VP can be acquired by the velocity computing unit 34 at the same time as measuring the up-down angles θy and the movement velocities Vα by using the measurement device 10 of the present embodiment. That is, the differential ΔV corresponding to the actual measured data of the up-down angles θy and the differential ΔVα is acquired.

A correlating equation (regression equation) to be used in calculating the up-down angle θy on the basis of the correlation between the differential ΔV and the actually measured data of the up-down angles θy is derived. The measurement device 10 is not necessarily provided with a function for calculating the correlating equation, and the calculation of the correlating equation may be performed by using a computer provided separately from the measurement device 10.

In other words, data is acquired in which the relation between the up-down angle θy and the differential ΔV is measured discretely. A conventional least-squares method is used to perform regression analysis on the acquired data whereby a correlating equation represented by the relation (polynomial expression) between the up-down angles θy and the differential ΔV is derived. That is, a characteristic line indicating the relation between the up-down angles θy and the differential ΔV can be arrived at based on the correlating equation derived in this way.

Therefore in the present embodiment, the calculation of the movement direction by the movement direction computing unit 36 is based on the correlating equation for calculating the movement direction that indicates the correlation between the previously measured movement direction of the golf ball 2 and the previously measured velocity VS of the mobile body at the reference time and the velocity VP of the mobile body at the elapsed time.

The characteristic line data indicated by the correlating equation may be stored as maps for calculating the up-down angles θy in place of the aforementioned correlating equation, and the up-down angles θy may be calculated using the maps. In this case, the maps may be provided in a memory, such as a ROM, in the microcomputer.

Figure 18:
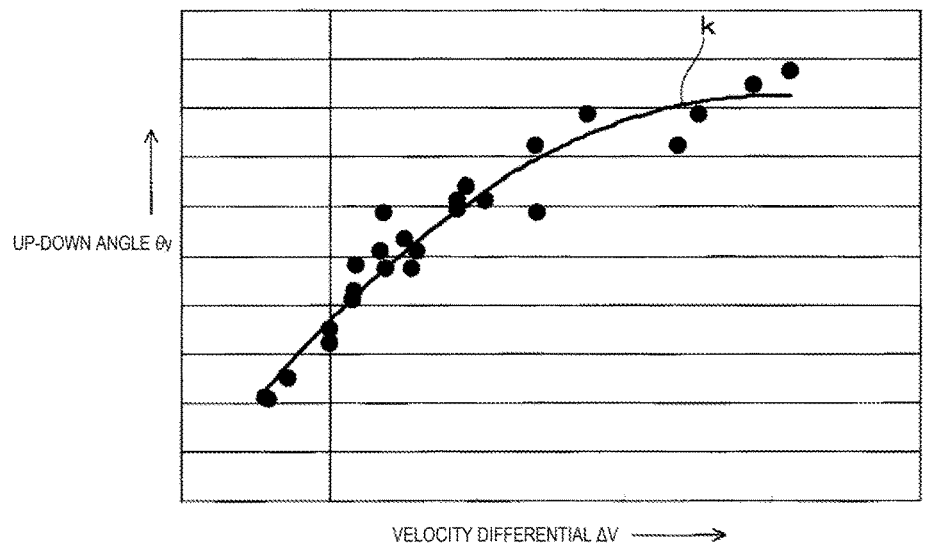
FIG. 18 illustrates a characteristic line k that expresses a correlation between an up-down angle θy and a differential ΔV.

FIG. 18 illustrates a characteristic line k that expresses the correlation between the up-down angles θy and the differential ΔV.

The horizontal axis represents the differential ΔV and the vertical axis represents the up-down angle θy. The black dots represent the data of the discretely measured up-down angles θy and the differential ΔV.

The characteristic line k expresses the correlation between the up-down angles θy and the differential ΔV and the correlating equation (regression equation) that expresses the characteristic line k is expressed, for example, with a secondary polynomial expression.

While the correlating equation is generated in the present embodiment by using the differential ΔV of the velocity VS at the prescribed reference time TS and the velocity VP at the elapsed time TP (velocity VS−velocity VP, or velocity VP−velocity VS), the correlating equation may be alternatively generated by using a ratio of the velocity VS and the velocity VP (VS/VP or VP/VS).

Operations of the measurement device 10 will be explained next with reference to the flow charts in FIG. 19 and FIG. 20.

First, the setting of the correlating equation that indicates the correlation between the differential ΔV of the velocities and the movement direction of the golf ball 2 will be explained with reference to FIG. 19.

The golf ball 2 is struck with different up-down angles θy and movement velocities Vα by using a dedicated golf ball striking device (swing robot) to measure the up-down angles θy and movement velocities Vα (step S10).

At the same time, the velocity VS at the reference time TS and the velocity VP at the elapsed time TP are measured by using the measurement device 10 (step S12).

Next, the differential ΔV is calculated on the basis of the velocity VS and the velocity VP by a computer separate from the measurement device 10 (step S14).

The correlating equations indicating the correlation between the differential ΔV and the vertical angle θy are calculated next (step S16).

Three correlating equations obtained in step S16 are set in the measurement device 10 (step S18).

The operations of the measurement device 10 for measuring the movement direction and the movement direction when the golf ball 2 is struck will be explained next with reference to FIG. 20.

Figure 19:
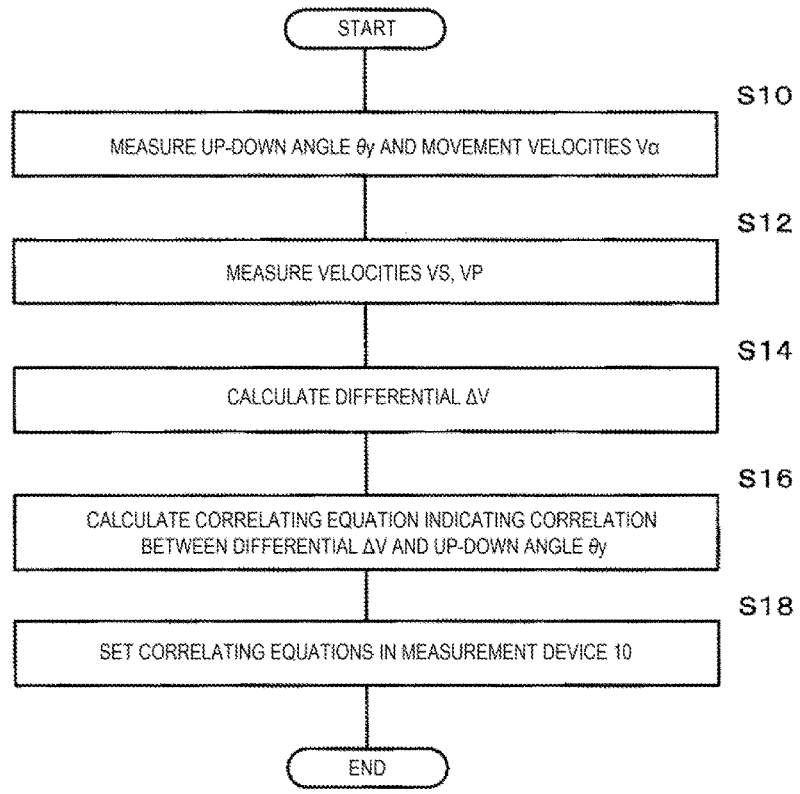
FIG. 19 is a flow chart for explaining setting processing of a correlating equation between the velocity differential ΔV and the movement direction of the golf ball 2.
Figure 20:
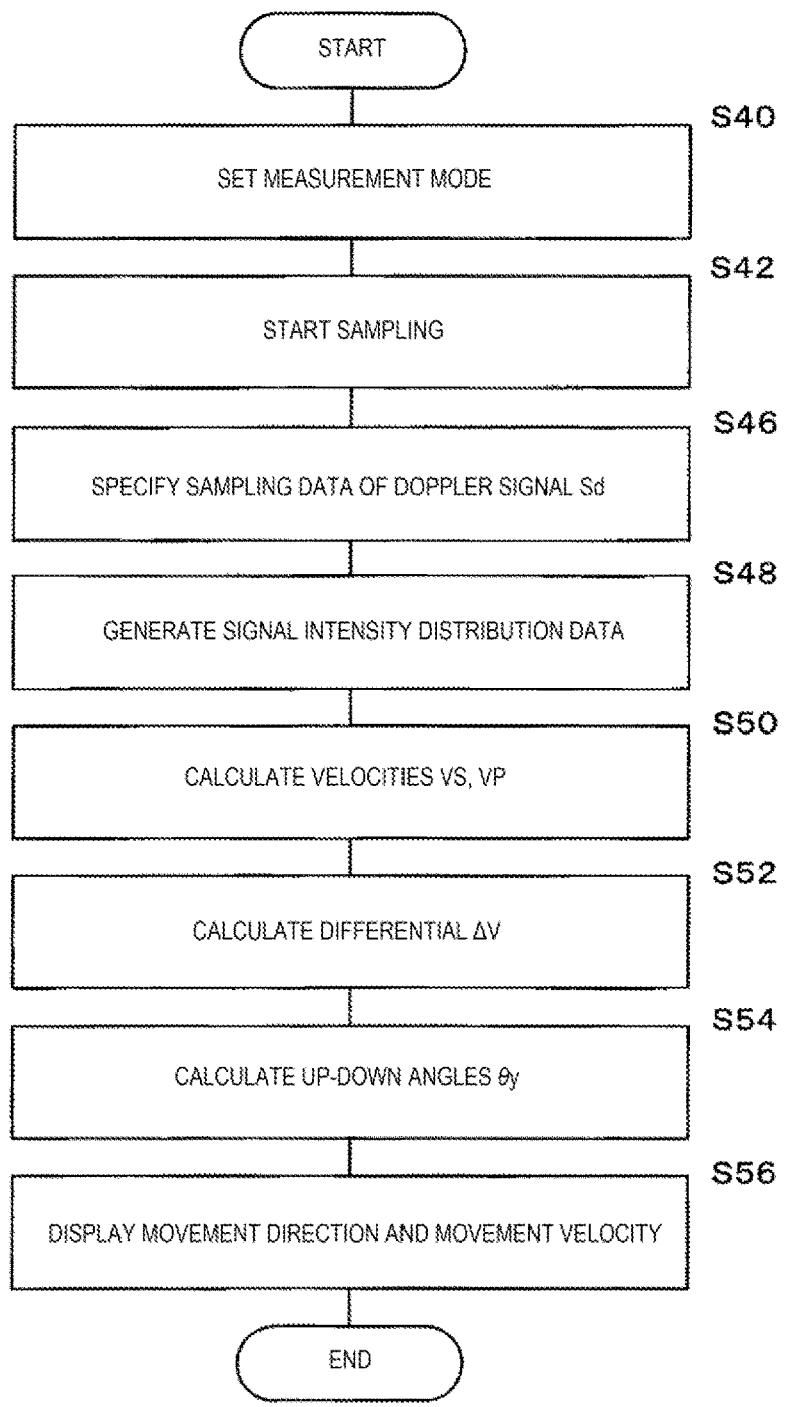
FIG. 20 is a flow chart for explaining measurement operations of the measurement device 10 for movement direction and movement velocity when the golf ball 2 is struck.

It is assumed that the processing in FIG. 19 has been performed and that the correlating equations are set in the measurement device 10.

First, a user installs a case 260 so that the antenna 14 is facing the golf ball 2 in a location 1 m to the rear of the golf ball 2 in the striking direction of the golf ball 2.

The case 260 may be placed for example on the ground G.

The user is prompted to arrange the installation position of the case 260 (that is, the installation position of the antenna 14) in approximately the same installation position as during the calculation of the correlating equations as illustrated in FIG. 16. That is, measurements by the measurement device 10 are performed at approximately the same position as the relative position of the movement starting point of the mobile body and the antenna during the actual measurements for determining the correlating equations.

As a result, the transmission wave W1 transmitted from the antenna 14 is able to hit the golf ball 2 and the reflected wave W2 can be received by the antenna 14.

The user operates the input unit 20 to set the measurement device 10 to the measurement mode for measuring the movement direction and the movement velocity of the golf ball 2 (step S40).

When the measurement mode is set, sampling of the Doppler signal Sd in the accumulating unit 30 is started (step S42).

The signal intensity distribution data generating unit 32 starts the sampling to the accumulating unit 30 and sampling data of the Doppler signal Sd is specified over predetermined segments (step S46).

The signal intensity distribution data generating unit 32 then generates the signal intensity distribution data PA (step S48).

The velocity computing unit 34 then calculates the velocity VS at the reference time TS and the velocity VP at the elapsed time TP from the signal intensity distribution data PA (step S50).

The movement direction computing unit 36 then calculates the differential ΔV of the velocity VS and the velocity VP (step S52), and calculates the up-down angles θy on the basis of the differential ΔV from the preset correlating equations (step S54).

The up-down angles θy obtained in this way are supplied to the display unit 18 as the movement direction and displayed, and the velocities VS and VP are supplied to the display unit 18 as the movement velocity and displayed (step S56). The series of measurement operations are completed.

The effects of the measurement device 10 according to the present embodiment will be explained next.

According to the present technology, a single antenna is provided that transmits the transmission wave W1 toward the mobile body (golf ball 2) and receives the reflected wave W2 reflected from the mobile body, and the movement direction is calculated from measured velocities on the basis of the correlation between the actual measurement values of the measured plurality of velocities and the movement direction previously obtained using an antenna.

Therefore, the movement direction and the movement velocity of a mobile body can be measured using a single antenna which is advantageous in reducing the cost and size of the measurement device 10.

When manufacturing the measurement device 10, the correlating equations are made and applied to the total number by averaging the data produced using an optional measuring apparatus or a plurality of measuring apparatuses as a standard. More preferably, the correlating equations are produced separately for each apparatus. As a result, the measurement device 10 can be made more accurately.

Moreover, there is an advantage in that manufacturing costs can be reduced because the tolerance for the positional accuracy, or specifically the tolerance of the positional accuracy of the antenna 14 can be eased when manufacturing the measurement device 10 while ensuring the accuracy of the movement direction due to the measurement of the movement direction on the basis of the correlation.

If the measurement device 10 of the present embodiment is applied to a golf simulator, the trajectory of the golf ball 2 can be accurately simulated on the basis of the movement direction and the movement velocity of the golf ball 2 calculated by the measurement device 10.

In particular, conventional golf simulators often measure the behavior of the golf ball 2 on the basis of image data of the golf ball 2 photographed by a high-speed camera and then simulate the trajectory of the golf ball 2 on the basis of the measurement results. A golf simulator that uses the image data in this way has a disadvantage in that it is difficult to set the operations of the high-speed camera because the image data imaged by the high-speed camera is affected by variations in illumination light or natural light.

Conversely, the measurement device 10 has an advantage in that the setting work for the golf simulator is simplified because the measurement device 10 is not affected by illumination light or natural light in the present embodiment.

Because the golf ball 2 must be photographed from a direction orthogonal to the movement direction of the golf ball 2 when using a high-speed camera, the high-speed camera needs to be placed in front of the golfer which is inconvenient in that the golfer feels pressure due to the high-speed camera being present in the field of vision of the golfer.

Conversely, the antenna may be placed away and to the rear of the golf ball 2 in the present embodiment which is advantageous in that the pressure felt by the golfer is limited because the antenna is unlikely to be within the field of view of the golfer.

Second Embodiment

Next, a second embodiment will be described.

While the measurement device 10 is a small and portable device in the first embodiment, the antenna 14 of the measurement device 10 according to the second embodiment is a horn antenna and a microphone is provided so as to simplify the specification of the periods for acquiring the sampling data.

Figure 21:
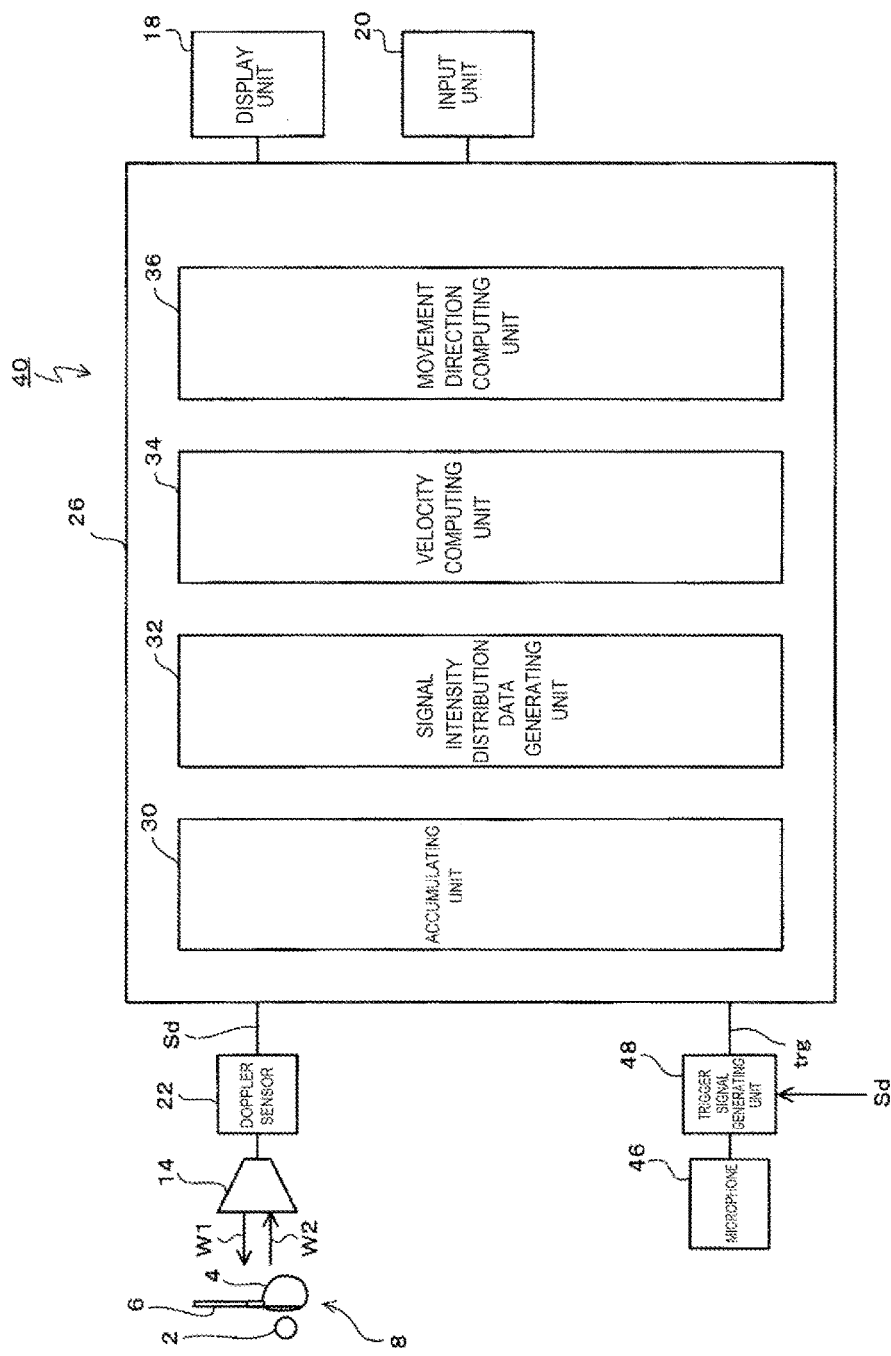
FIG. 21 is a functional block diagram of a measurement device according to a second embodiment.

FIG. 21 is a block diagram of a functional configuration of a measurement device 40 according to the second embodiment. The measurement device 40 according to the second embodiment is provided with a microphone 46 and a trigger signal generating unit 48 in addition to the components of the measurement device 10 according to the first embodiment.

The microphone 46 records a striking sound generated by the golf ball 2 being struck by the golf club head 4, and detects an audio signal.

The trigger signal generating unit 48 generates trigger signal trg and supplies the trigger signal trg to the measurement processing unit 24 when the amplitude of the audio signal detected by the microphone 46 rises above a predetermined threshold value.

The trigger signal trg acts as an instruction to the measurement processing unit 24 to start of belowmentioned data processing.

If the abovementioned trigger signal generating unit 48 generates the trigger signal trg simply in response to a striking sound, there is a concern that the following problem may occur due to the installation environment of the measurement device 10.

That is, if the installation environment of the measurement device 10 is a golf driving range provided with a plurality of hitting stations, there is a concern that the trigger signal trg may be generated due to a striking sound from a surrounding hitting station outside of the hitting station subject to the measurement by the measurement device 10 and an operational error by the measurement device 10 may occur.

Therefore, in the present embodiment the following configuration is provided in order to prevent the above operational error.

The audio signal from the microphone 46 as well as the Doppler signal Sd from the Doppler sensor 22 are inputted into the trigger signal generating unit 48.

The trigger signal generating unit 48 generates the trigger signal trg and supplies the trigger signal trg to the measurement processing unit 24 when the Doppler signal Sd is received and when the audio signal of the striking sound exceeds a predetermined threshold value. In this case, the Doppler signal Sd generated at first is the detection of movement of the golf club head 4.

Therefore, there is an advantage in that the trigger signal generating unit 48 generates the trigger signal trg with both the movement of the golf club head 4 and the striking sound whereby an operational error by the measurement device 40 can be prevented in a more secure manner.

So long as the trigger signal trg is generated by the trigger signal generating unit 48, another sensor may be used in place of the microphone 46. For example, a light sensor may be provided to detect the golf club head 4 passing through a predetermined specific position (e.g., the movement starting position O), and the trigger signal generating unit 48 may generate the trigger signal trg on the basis of the detection signal of the light sensor. However, there is an advantage in that the microphone 46 as in the present embodiment allows the installation work to be performed more easily because the installation position and the direction need to be finely adjusted when using the light sensor.

Figure 22:
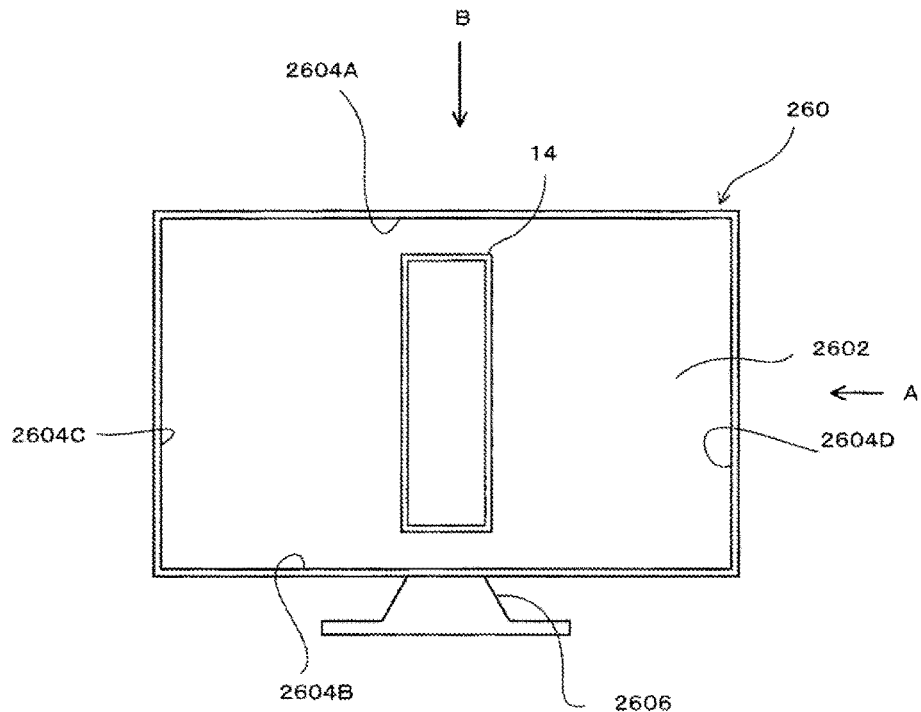
FIG. 22 is a front view illustrating a configuration of the antenna 14.
Figure 23:
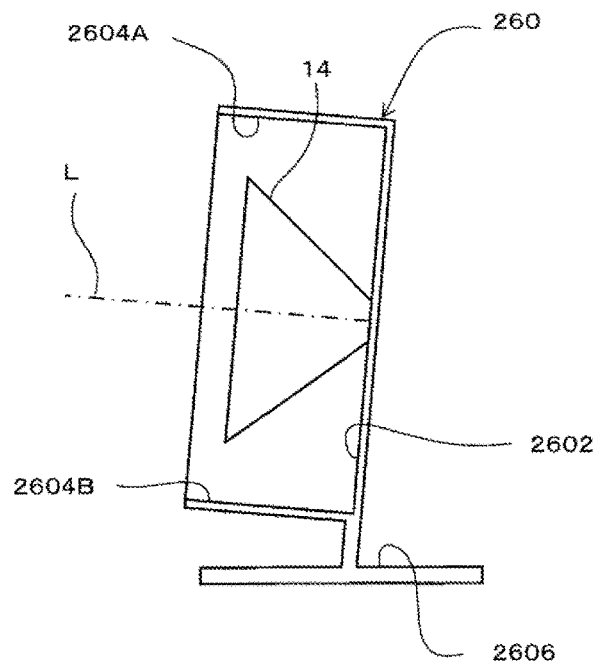
FIG. 23 is a view along arrow A of FIG. 22.
Figure 24:
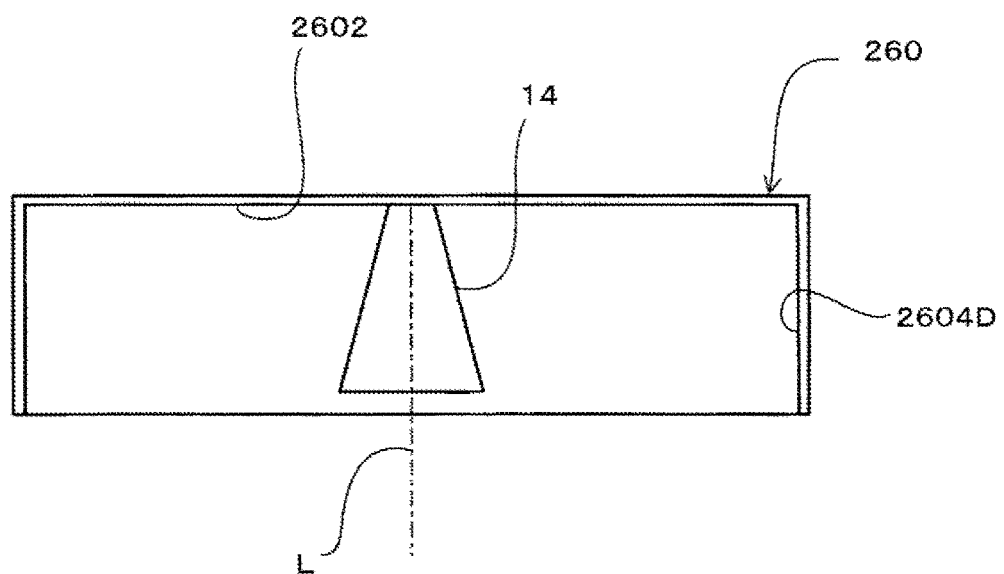
FIG. 24 is a view along arrow B of FIG. 22.

FIG. 22 is a front view of a configuration of the antenna 14 in the measurement device 40, and FIG. 23 is a view along arrow A in FIG. 22 and FIG. 24 is a view along arrow B in FIG. 22.

As illustrated in FIGS. 22 to 24, the antenna 14 is contained inside the case 260.

The case 260 includes a rear plate 2602, up and down and left and right side plates 2604A, 2604B, 2604C, 2604D, and a stand 2606.

A rear plate 2602 has a rectangular planar shape and is provided parallel to the horizontal direction of the up and down sides and is inclined further to the rear as the rear plate 2602 extends upwards.

The up and down and left and right side plates 2604A to 2604D extend outward from the up and down and left and right sides of the rear plate 2602 and a rectangular opening is formed with the front edges of the side plates 2604A to 2604D.

The stand 2606 is provided in the center on the bottom surface of a lower part of the side plate 2604B and is placed on the ground or a floor.

The antenna 14 is attached to the front surface of the rear plate 2602 while facing forward through the opening, and is contained inside the space enclosed by the rear plate 2602 and the side plates 2604A to 2604D. The front part of the antenna 14 is positioned to the rear of the front edges of the side plates 2604A to 2604D.

The opening is covered by a cover, which is not illustrated, formed from a material that allows the permeation of the transmission wave W1 and the reflected wave W2, and the cover protects and acts as a dust cover for the antenna 14.

As illustrated in FIG. 22, the antenna 14 as seen from the front is disposed in approximately the center part of the rear plate 2602 in the present embodiment.

The accumulating unit 30 (see FIG. 12) in the measurement device 40 accumulates the Doppler signals Sd and the trigger signals trg in a predetermined sampling period in order according to the passage of time. Specifically, the CPU 26A stores the Doppler signals Sd and the trigger signals trg sampled during the sampling period as sampling data of the Doppler signals Sd and as sampling data of the trigger signals trg in the RAM 26C.

Moreover, the signal intensity distribution data generating unit 32 generates signal intensity distribution data by performing frequency analysis (continuous FFT analysis or wavelet analysis) of the sampling data of the Doppler signals Sd accumulated in the accumulating unit 30.

In other words, the signal intensity distribution data generating unit 32 generates the signal intensity distribution data which indicates the distribution of the signal intensity for each frequency by performing frequency analysis on the Doppler signals Sd obtained from the Doppler sensor 22.

Specifically, the signal intensity distribution data generating unit 32 specifies predetermined segments of the sampling data of the Doppler signal Sd that is time series data accumulated in the accumulating unit 30 to generate the signal intensity distribution data on the basis of the trigger signals trg accumulated in the accumulating unit 30. The sampling data segments for the Doppler signals Sd in this case are specified on the basis of the trigger signal trg.

In other words, the signal intensity distribution data generating unit 32 generates the signal intensity distribution data by specifying the sampling data in a segment after the golf ball 2 is struck among the sampling data of the Doppler signals Sd accumulated according to an uncontrolled discharge system.

More specifically, there is provided in the second embodiment a sensor for detecting movement of the golf club head 4 (striking implement) that strikes the golf ball 2 that is a sports ball, and the trigger signal generating unit 48 for generating the trigger signal trg that indicates that the sports ball has been struck by the striking implement on the basis of the detection results from the sensor, and the signal intensity distribution data generating unit 32 specifies the reference time TS and the prescribed time period ΔT that has elapsed after the reference time TS on the basis of the trigger signal trg and generates the signal intensity distribution data between the reference time TS and the prescribed time period ΔT that has elapsed after the reference time TS. The sensor in the present embodiment is the microphone that collects the striking sound of the sports ball struck by the striking implement. The trigger signal generating unit 48 then is enabled to generate the trigger signal trg when the striking sound of the sports ball being struck by the striking implement is collected and when the Doppler signal is generated by the Doppler sensor 22.

According to this configuration, the time point when the golf ball 2 is struck by the golf club head 4, that is, the time point when the movement of the golf ball 2 starts, can be specified and the measuring accuracy of the measurement device 40 can be improved.

Third Embodiment

Next, a third embodiment will be described.

The first and second embodiments are implemented by the signal intensity distribution data generating unit 32 specifying predetermined segments of the sampling data of the Doppler signal Sd that is time series data accumulated in the accumulating unit 30 to generate the signal intensity distribution data.

A method for generating signal intensity distribution data by excluding sampling data counted from a reference time point to the ath time point using the power-up time point of the measurement device or using the time point of the detection of the trigger signal trg as the reference time point, and specifying the sampling data from the a+1th time to the bth time (where a<b) has been described as the method implemented for specifying the sampling data in the predetermined segments.

However, the head speed of the golf club head 4 differs according to the golfer and varies according to each swing. If the head speed is different, the movement velocity of the struck golf ball 2 differs and, as a result, the position with regard to the reference spot of the golf ball 2 acquired in the sampling data may also exhibit variation even if the segments for specifying are the same.

When the position (range) of the golf ball 2 acquired in the sampling data changes, the correlation between the velocities VS and VP and the movement direction of the golf ball is affected and the value of the finally calculated movement direction is also affected.

Therefore, in order to ensure the accuracy of the finally calculated movement direction, it is preferable to correct the segments for specifying the sampling data in response to the movement velocity of the golf ball 2 so as to specify the sampling data when the golf ball 2 is in the same position (range) regardless of the movement velocity of the golf ball 2.

Figure 25:
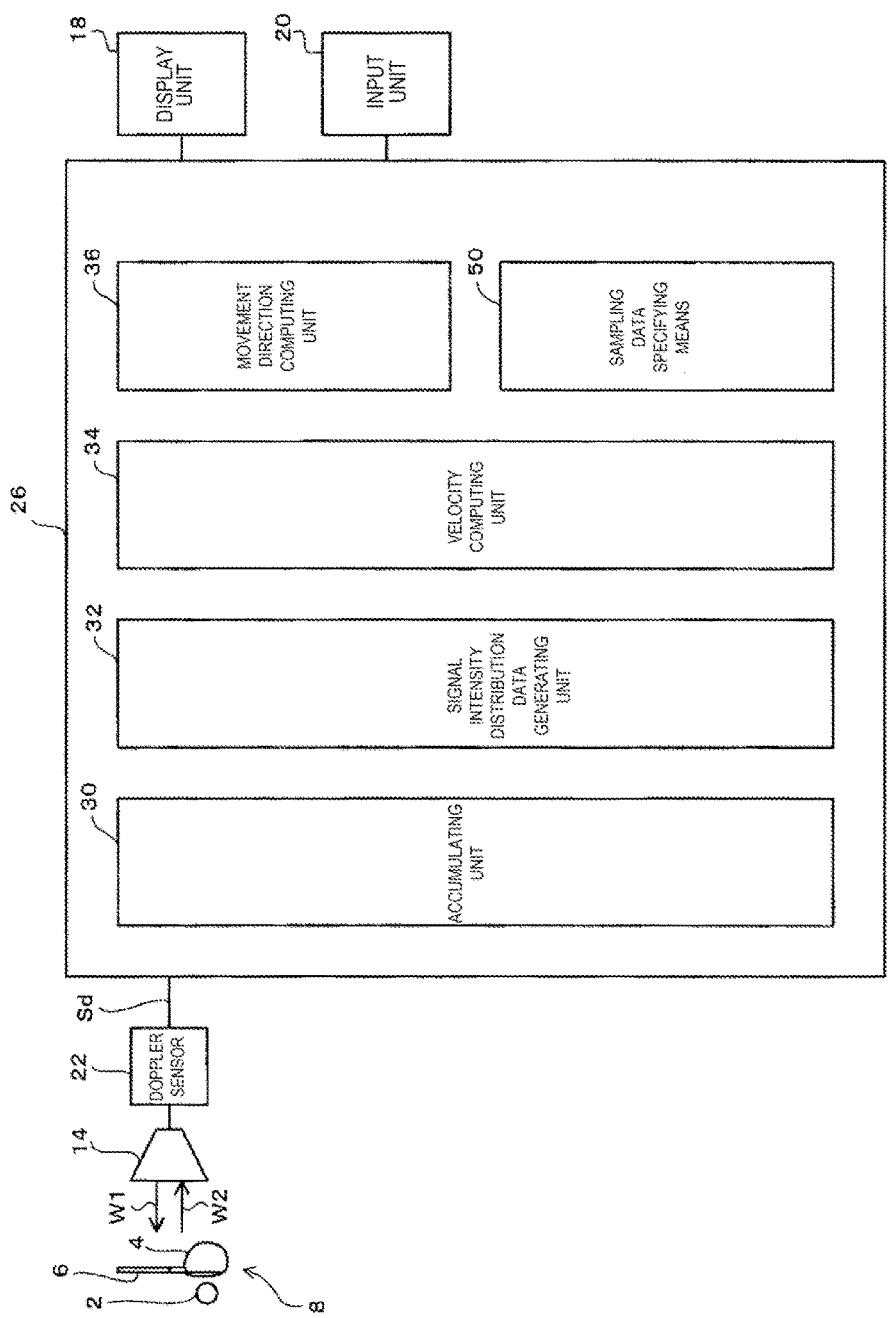
FIG. 25 is a functional block diagram of a measurement device according to a third embodiment.

As illustrated in FIG. 25, the measurement processing unit 24 in the third embodiment is further provided with a sampling data specifying means 50 for correcting the segments for specifying the sampling data in addition to the configuration illustrated in FIG. 12.

The correction by the sampling data specifying means 50 involves presetting a position spaced away in front of the movement starting position O and excluding the sampling data from when the golf ball 2 is struck by the golf club head 4 until the golf ball 2 reaches the position.

That is, a position spaced away in front of the movement starting position O by a predetermined distance X is preset as a sampling segment starting position Os.

The sampling data specifying means 50 includes a function to generate the sampling data of the Doppler signal obtained from the accumulating unit 30 and the signal intensity distribution data PA on the basis of the power-up time point or on the basis of the trigger signal trg. However, the signal intensity distribution data generating unit 32 is different due to the feature of generating the signal intensity distribution data PA on the basis of the sampling data after the power-up time point or after the trigger signal trg without specifying a segment for sampling data.

Moreover, the sampling data specifying means 50 includes a function for deriving a temporary movement velocity Vβ on the basis of the generated signal intensity distribution data PA.

More specifically, Doppler frequency components are detected from the signal intensity distribution data PA corresponding to the portion where the signal intensity P is high in the region where the frequency f is low as illustrated in FIG. 14, and the temporary movement velocity Vβ is derived on the basis of these Doppler frequency components.

While the temporary movement velocity Vβ is strictly speaking a movement velocity of the golf club head 4, the error as a result of considering the temporary movement velocity Vβ as the temporary movement velocity of the golf ball 2 can be ignored.

The sampling data specifying means 50 uses the following equation (3) to derive a sampling data number a from the power-up time point or thereafter or from the time point when the trigger signal trg is detected (reference time point).

$$a=(X/V\beta)/(1/Ts) \quad (3)$$

where Ts is the sampling period of the accumulating unit 30.

Therefore, the ath sampling data of the sampling data represents the sampling data from when the golf club head 4 strikes the golf ball 2 until the position at the distance X.

The sampling data specifying means 50 supplies the sampling data number a to the signal intensity distribution data generating unit 32.

Consequently, the signal intensity distribution data generating unit 32 generates the signal intensity distribution data by excluding sampling data counted from the reference time point up to the ath time in the same way as the first embodiment, and specifies the sampling data from the a+1th time to the bth time (where a<b).

The subsequent processing is the same as that of the first embodiment and an explanation is omitted.

That is, the sampling data specifying means 50 is provided that calculates the velocity of a mobile body at or after the power-up time point or the time point the trigger signal is generated and at a time earlier than the reference time and predicts a time when the mobile body reaches the reference spot in order to correct the reference time, and the signal intensity distribution data generating unit 32 generates the signal intensity distribution data from the reference time corrected by the sampling data specifying means 50 until a prescribed time period has elapsed in the third embodiment.

As described above, there is an advantage that accuracy of the measured movement direction and movement velocity of the golf ball 2 can be ensured because the sampling data when the golf ball 2 is in the same position (range) regardless of the movement velocity of the golf ball 2 can be specified according to the third embodiment.

While the sampling data specifying means 50 is described in the third embodiment as being provided separately from the signal intensity distribution data generating unit 32 and the velocity computing unit 34, it is obvious that the same functions as the sampling data specifying means 50 may be implemented by the signal intensity distribution data generating unit 32 and the velocity computing unit 34.

What is claimed is:

1. A mobile body measurement device comprising:
   a single antenna having directionality and configured to transmit a transmission wave toward a mobile body based on a supplied transmission signal, and further configured to receive a reflected wave reflected from the mobile body and generate a reception signal;
   a Doppler sensor configured to supply the transmission signal to the antenna and generate a Doppler signal having a Doppler frequency based on the reception signal supplied from the antenna;
   a signal intensity distribution data generating unit configured to generate signal intensity distribution data indicating a distribution of signal intensities in each frequency by performing frequency analysis on the Doppler signal obtained from the Doppler sensor;

a velocity computing unit configured to detect Doppler frequency components corresponding to a movement velocity of the mobile body based on the signal intensity distribution data, and further configured to calculate velocities based on the detected Doppler frequency components at a reference time and at a prescribed time period after the reference time; and a movement direction computing unit configured to calculate a movement direction from the velocities calculated by the velocity computing unit based on a previously derived correlation between a previously measured movement direction of the mobile body and a differential between a previously measured velocity of the mobile body at a previous reference time and a previously measured velocity of the mobile body when a previous prescribed time period had elapsed after the previous reference time;

wherein the reference time is a time when the mobile body is predicted to move to a reference spot spaced away from a movement starting spot by a prescribed distance, and the prescribed time period is a time period when the mobile body is predicted to reach a post-movement spot spaced away from the reference spot by the prescribed distance.

2. The mobile body measurement device according to claim 1, wherein: a plane that extends in a vertical direction and includes an imaginary line that extends in a horizontal direction through a predetermined movement starting position is established as a reference vertical plane;

a plane that passes through the movement starting position and that is orthogonal to the reference vertical plane is established as a reference horizontal plane;

an angle formed by the reference horizontal plane and a movement path obtained by projecting, onto the reference vertical plane, a movement path when the mobile body moves from the movement starting position is established as an up-down angle; and an angle formed by the reference vertical plane and a movement path obtained by projecting, onto the reference horizontal plane, a movement path when the mobile body moves from the movement starting position is established as a left-right angle;

the movement direction calculated by the movement direction computing unit is expressed by either the up-down angle or the left-right angle; and a gain distribution of the antenna differs according to the up-down angle and the left-right angle, and an installation is made so that a wide side of the gain distribution represents the movement direction calculated by the movement direction computing unit.

3. The mobile body measurement device according to claim 2, wherein: a ratio between the wide side of the gain distribution and a narrow side of the gain distribution is 1.5 to 5 in the antenna.

4. The mobile body measurement device according to claim 3, wherein:

a calculation of the movement direction by the movement direction computing unit is conducted based on a correlating equation that expresses the previously derived correlation between the previously measured movement direction of the mobile body and the differential of the previously measured velocity of the mobile body at the previous reference time and the previously measured velocity of the mobile body after the previous prescribed time period had elapsed;

the correlating equation for calculating the movement direction is determined by fixing a relative position between the antenna and the movement starting position of the mobile body and using an actual measured movement direction; and a measurement by the measurement device is conducted at substantially a same position as the relative position between the antenna and the movement starting position of the mobile body at the time of an actual measurement for determining the correlating equation.

5. The mobile body measurement device according to claim claim 4, wherein: a plurality of the prescribed time periods are set, and the plurality of the prescribed time periods are time periods when the mobile body is predicted to reach each of a plurality of post-movement spots spaced away from the reference spot by integral multiples of the prescribed distance.

6. The mobile body measurement device according to claim 5, further comprising: a sampling data specifying unit configured to calculate a velocity of the mobile body at a power-up time or after a trigger signal generation time and earlier than the reference time, predict a time when the mobile body reaches the reference spot, and correct the reference time; wherein, the signal intensity distribution data generating unit generates the signal intensity distribution data from the reference time corrected by the sampling data specifying unit until the prescribed time period has elapsed.

7. The mobile body measurement device according to claim 6, wherein: the sampling data specifying unit detects Doppler frequency components corresponding to a portion of the signal intensity distribution data in which the signal intensity is high in a region where the frequency is relatively low, derives a temporary movement velocity of the mobile body based on the detected Doppler frequency components, and uses the temporary movement velocity to predict a time when the mobile body reaches the reference spot.

8. The mobile body measurement device according to claim 7, wherein: the signal intensity distribution data generating unit specifies the reference time and the prescribed time period elapsed after the reference time based on the power-up time of the measurement device, and generates the signal intensity distribution data between the reference time and the prescribed time period elapsed after the reference time.

9. The mobile body measurement device according to claim 1, wherein:

a calculation of the movement direction by the movement direction computing unit is conducted based on a correlating equation that expresses the previously derived correlation between the previously measured movement direction of the mobile body and the differential of the previously measured velocity of the mobile body at the previous reference time and the previously measured velocity of the mobile body after the previous prescribed time period had elapsed;

the correlating equation for calculating the movement direction is determined by fixing a relative position between the antenna and the movement starting position of the mobile body and using an actual measured movement direction; and a measurement by the measurement device is conducted at substantially a same position as the relative position between the antenna and the movement starting position of the mobile body at the time of an actual measurement for determining the correlating equation.

10. The mobile body measurement device according to claim 1, wherein: a plurality of the prescribed time periods are set, and the plurality of the prescribed time periods are time periods when the mobile body is predicted to reach each of a plurality of post-movement spots spaced away from the reference spot by integral multiples of the prescribed distance.

11. The mobile body measurement device according to claim 1, further comprising: a sampling data specifying unit configured to calculate a velocity of the mobile body at a power-up time or after a trigger signal generation time and earlier than the reference time, predict a time when the mobile body reaches the reference spot, and correct the reference time; wherein, the signal intensity distribution data generating unit generates the signal intensity distribution data from the reference time corrected by the sampling data specifying unit until the prescribed time period has elapsed.

12. The mobile body measurement device according to claim 11, wherein: the sampling data specifying unit detects Doppler frequency components corresponding to a portion of the signal intensity distribution data in which the signal intensity is high in a region where the frequency is relatively low, derives a temporary movement velocity of the mobile body based on the detected Doppler frequency components, and uses the temporary movement velocity to predict a time when the mobile body reaches the reference spot.

13. The mobile body measurement device according to claim 1, wherein: the signal intensity distribution data generating unit specifies the reference time and the prescribed time period elapsed after the reference time based on a power-up time of the measurement device, and generates the signal intensity distribution data between the reference time and the prescribed time period elapsed after the reference time.

14. The mobile body measurement device according to claim 1, wherein: the mobile body is a sports ball struck by a striking implement; and the mobile body measurement device further comprises: a sensor for detecting movement of the striking implement, and a trigger signal generating unit for generating a trigger signal which indicates that the sports ball has been struck by the striking implement based on a detection result from the sensor; and the signal intensity distribution data generating unit specifies the reference time and the prescribed time period elapsed after the reference time based on the trigger signal, and generates the signal intensity distribution data between the reference time and the prescribed time period elapsed after the reference time.

15. The mobile body measurement device according to claim 14, wherein: the sensor is a microphone that collects a striking sound of the sports ball due to the striking implement.

16. The mobile body measurement device according to claim 14, wherein: the trigger signal generating unit generates the trigger signal when a striking sound of the sports ball is collected due to the striking implement and the Doppler signal is generated by the Doppler sensor.

17. The mobile body measurement device according to claim 1, wherein: the mobile body is a sports ball.

18. A mobile body measurement method comprising the steps of:

transmitting a transmission wave toward the mobile body using a single antenna that has directionality based on a supplied transmission signal, receiving a reflected wave reflected from the mobile body, and generating a reception signal;

supplying the transmission signal to the antenna using a Doppler sensor and generating a Doppler signal having a Doppler frequency based on the reception signal from the antenna;

generating signal intensity distribution data which indicates a distribution of a signal intensity for each frequency by performing frequency analysis on the Doppler signal obtained from the Doppler sensor;

detecting Doppler frequency components corresponding to a movement velocity of the mobile body based on the signal intensity distribution data, and calculating by a velocity computing unit, velocities based on the detected Doppler frequency components at a reference time and at a prescribed time period after the reference time; and calculating a movement direction from the velocities calculated by the velocity computing unit based on a previously derived correlation between a previously measured movement direction of the mobile body and a differential between a previously measured velocity of the mobile body at a previous reference time and a previously measured velocity of the mobile body when a previous prescribed time period had elapsed after the previous reference time;

wherein the reference time is a time when the mobile body is predicted to move to a reference spot spaced away from a movement starting spot by a prescribed distance, and the prescribed time period is a time period when the mobile body is predicted to reach a post-movement spot spaced away from the reference spot by the prescribed distance.

* * * * *